United States Patent [19]
Takeshima et al.

[11] Patent Number: 6,008,690
[45] Date of Patent: Dec. 28, 1999

[54] BOOSTER CIRCUIT

[75] Inventors: Toshio Takeshima; Masayoshi Ohkawa; Hiroshi Sugawara; Noaki Sudo, all of Tokyo, Japan

[73] Assignee: NEC Corporation, Tokyo, Japan

[21] Appl. No.: 09/095,050

[22] Filed: Jun. 10, 1998

[30]       Foreign Application Priority Data

Jun. 11, 1997  [JP]  Japan ................................. 9-153681

[51] Int. Cl.⁶ .................................................. H03K 3/01
[52] U.S. Cl. ........................ 327/534; 327/536; 327/589; 363/60
[58] Field of Search ................................... 327/534–537, 327/306, 589, 590, 427; 370/110; 363/59, 60; 326/80, 81, 87

[56]              References Cited

U.S. PATENT DOCUMENTS

| | | | |
|---|---|---|---|
| 4,236,199 | 11/1980 | Stewart | 363/60 |
| 5,489,870 | 2/1996 | Arakawa | 327/536 |
| 5,499,183 | 3/1996 | Kobatake | 363/59 |
| 5,621,342 | 4/1997 | Wong et al. | 327/108 |
| 5,625,544 | 4/1997 | Kowshik et al. | 363/59 |
| 5,767,728 | 6/1998 | Michail et al. | 327/374 |
| 5,818,289 | 10/1998 | Chevallier et al. | 327/536 |
| 5,892,267 | 4/1999 | Takada | 327/536 |

FOREIGN PATENT DOCUMENTS

| | | |
|---|---|---|
| 8-256473 | 10/1996 | Japan . |
| 9-8229 | 1/1997 | Japan . |

*Primary Examiner*—Timothy P. Callahan
*Assistant Examiner*—An T. Luu
*Attorney, Agent, or Firm*—Sughrue, Mion, Zinn, Macpeak & Seas, PLLC

[57]              ABSTRACT

The present invention relates to a booster circuit which uses multiple pump circuits to provide high voltages. The pump circuits are provided with an input voltage Vcc and are generally each made up of a diode and a capacitor. A node driving circuit provides driving signals to driving nodes and thereby to the pump circuits. The driving nodes are connected by a charge transfer switch which is selectively activated so as to allow charge that would otherwise be lost to ground to be conserved for inclusion in the final high-output voltage.

23 Claims, 18 Drawing Sheets

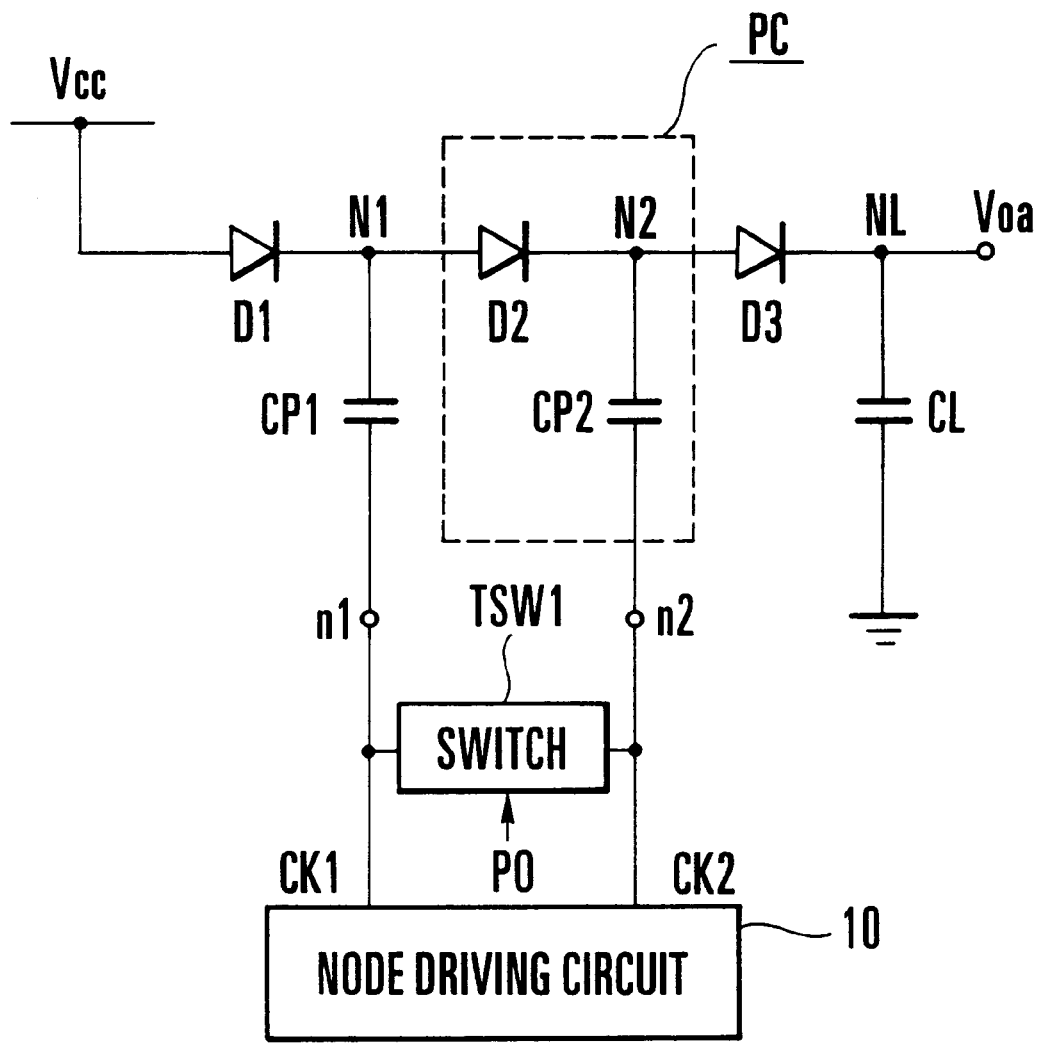
F I G. 1

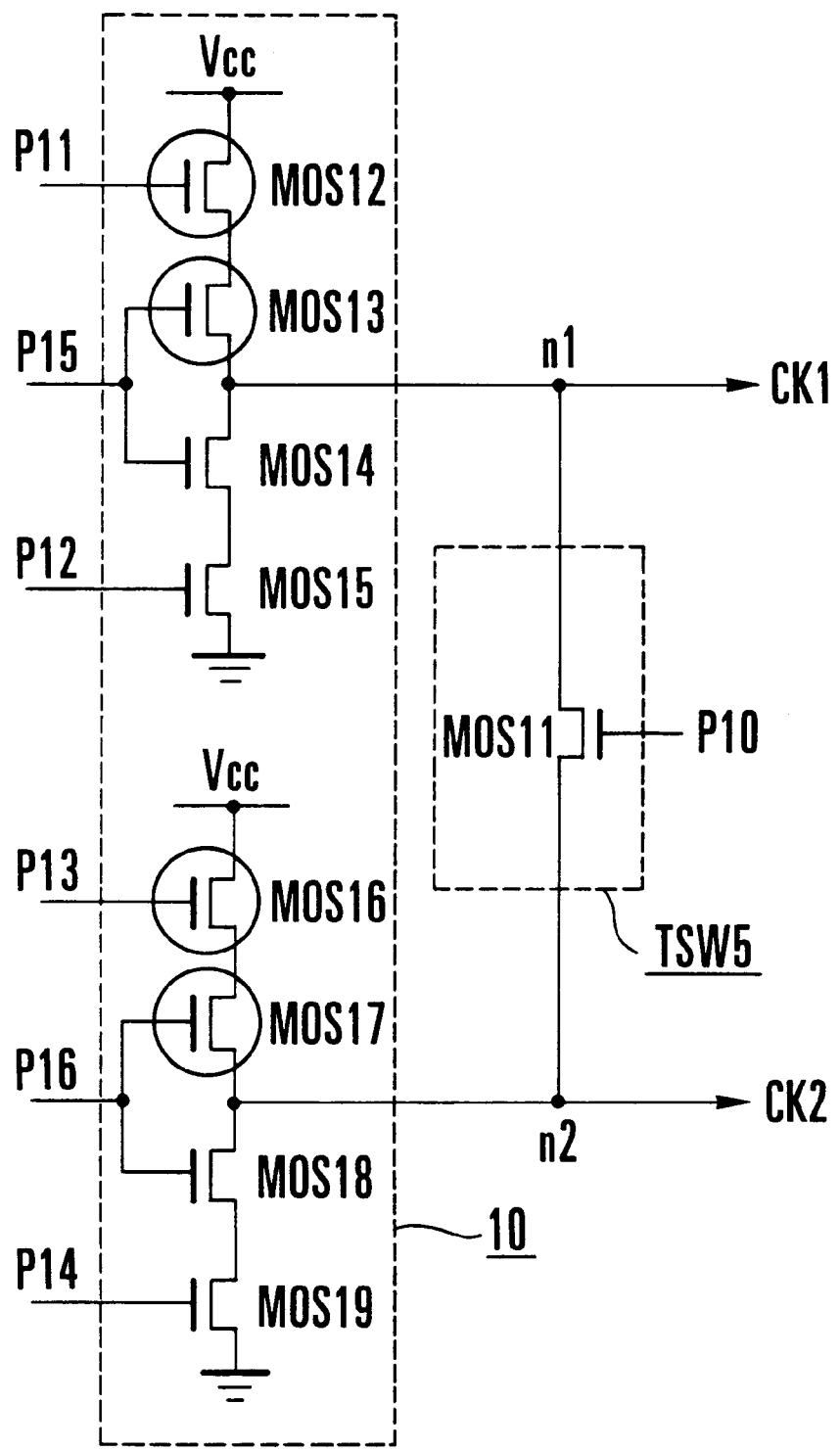
F I G. 5

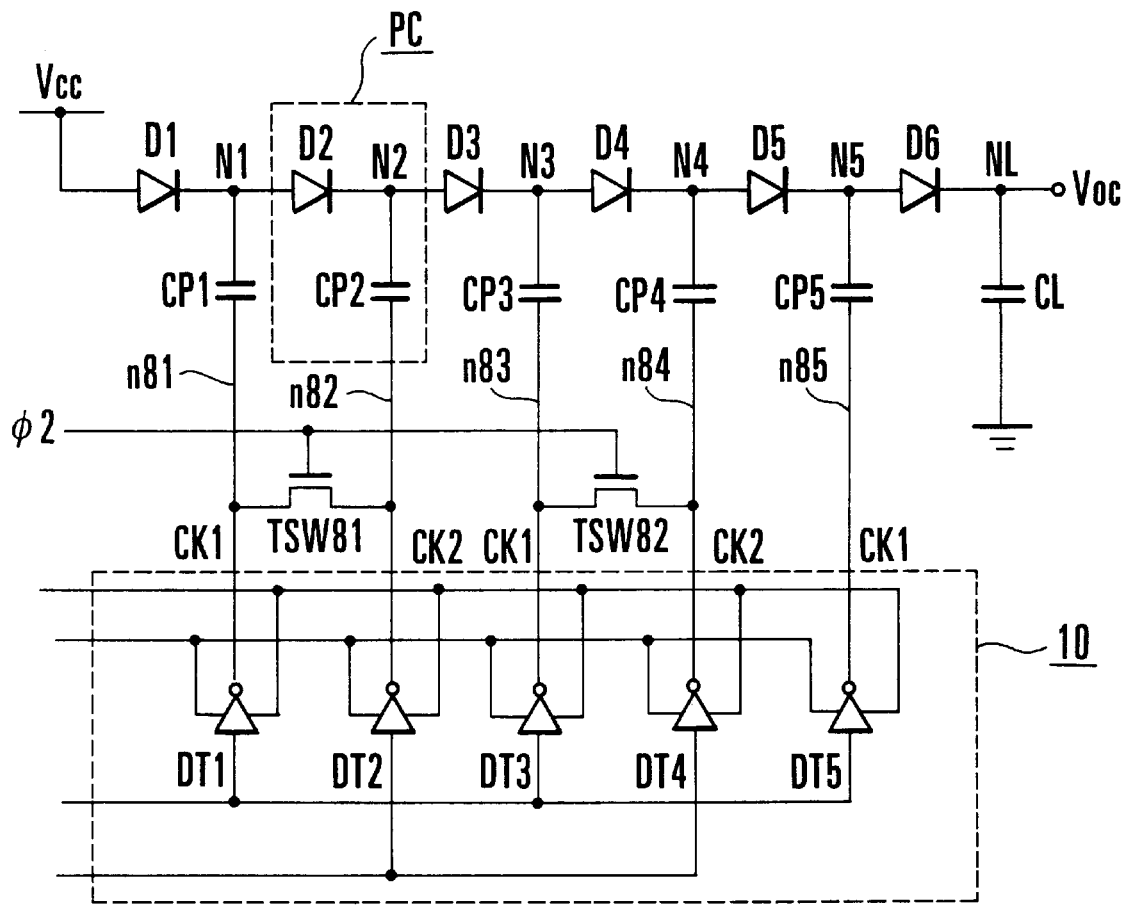
F I G. 8

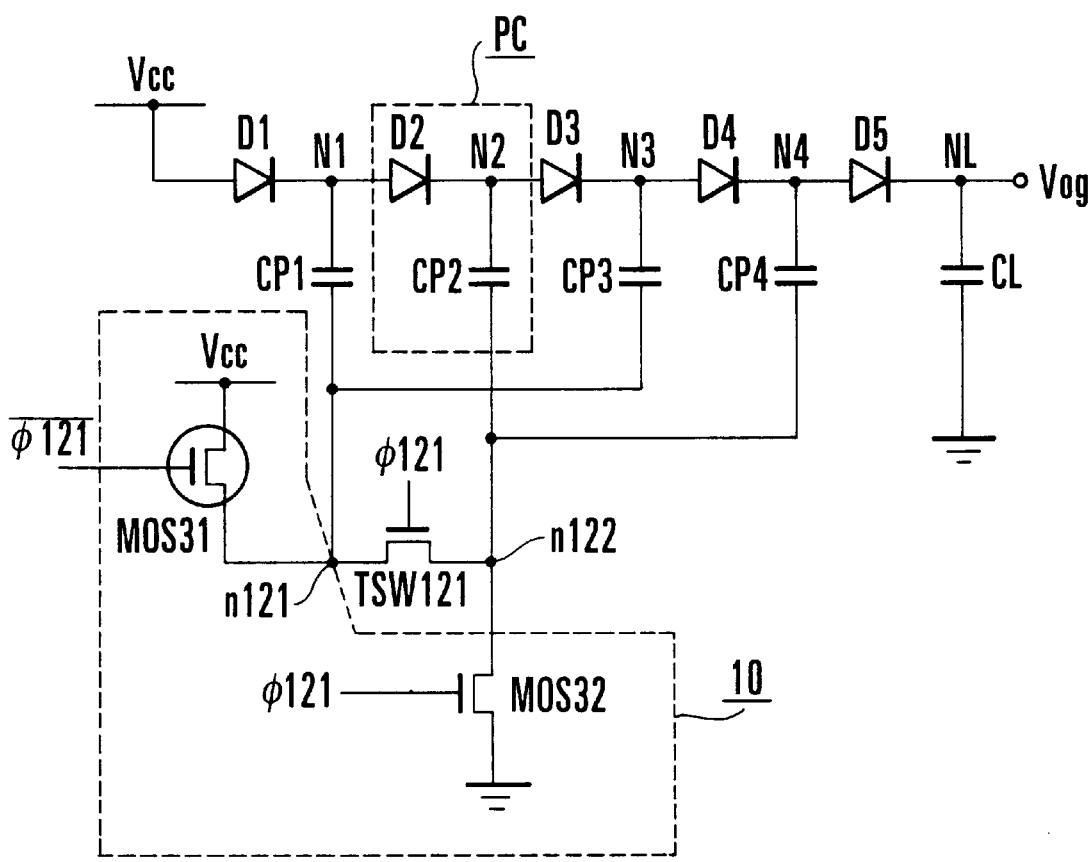
F I G. 12

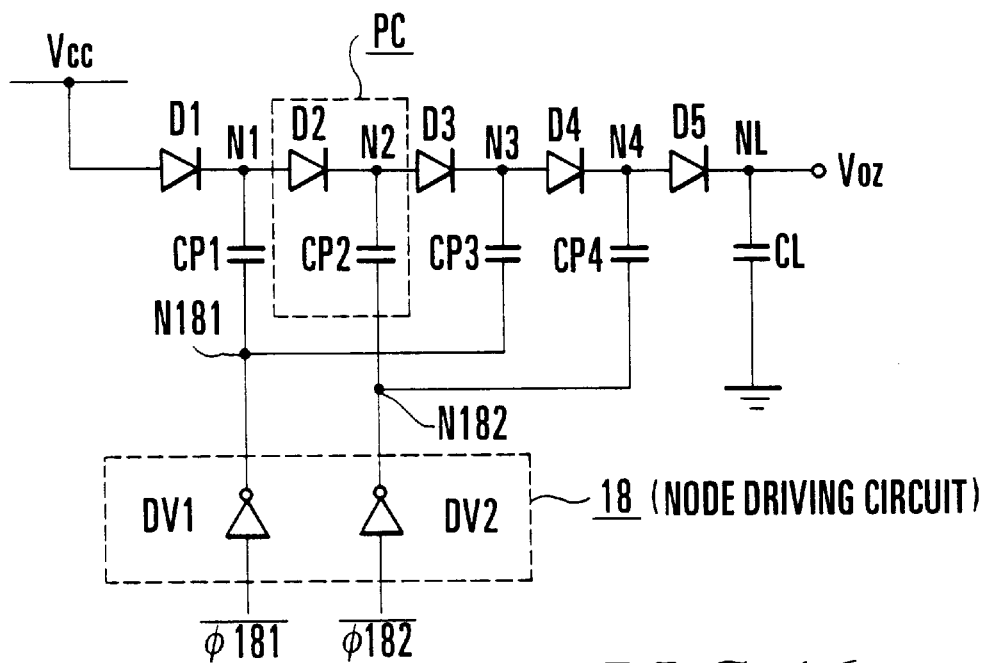
FIG. 16
PRIOR ART
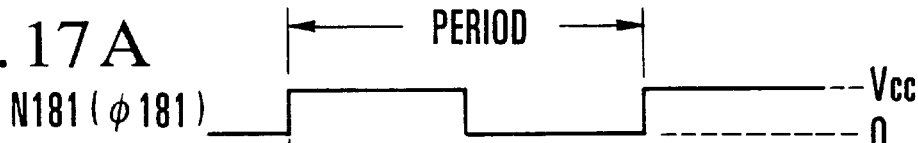
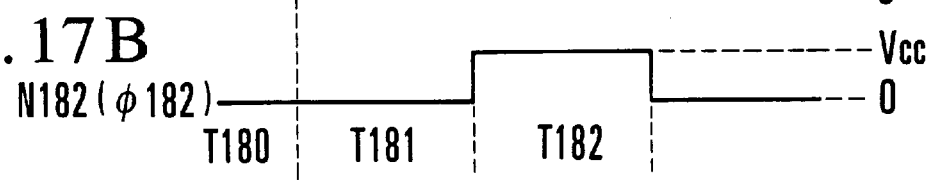
PRIOR ART

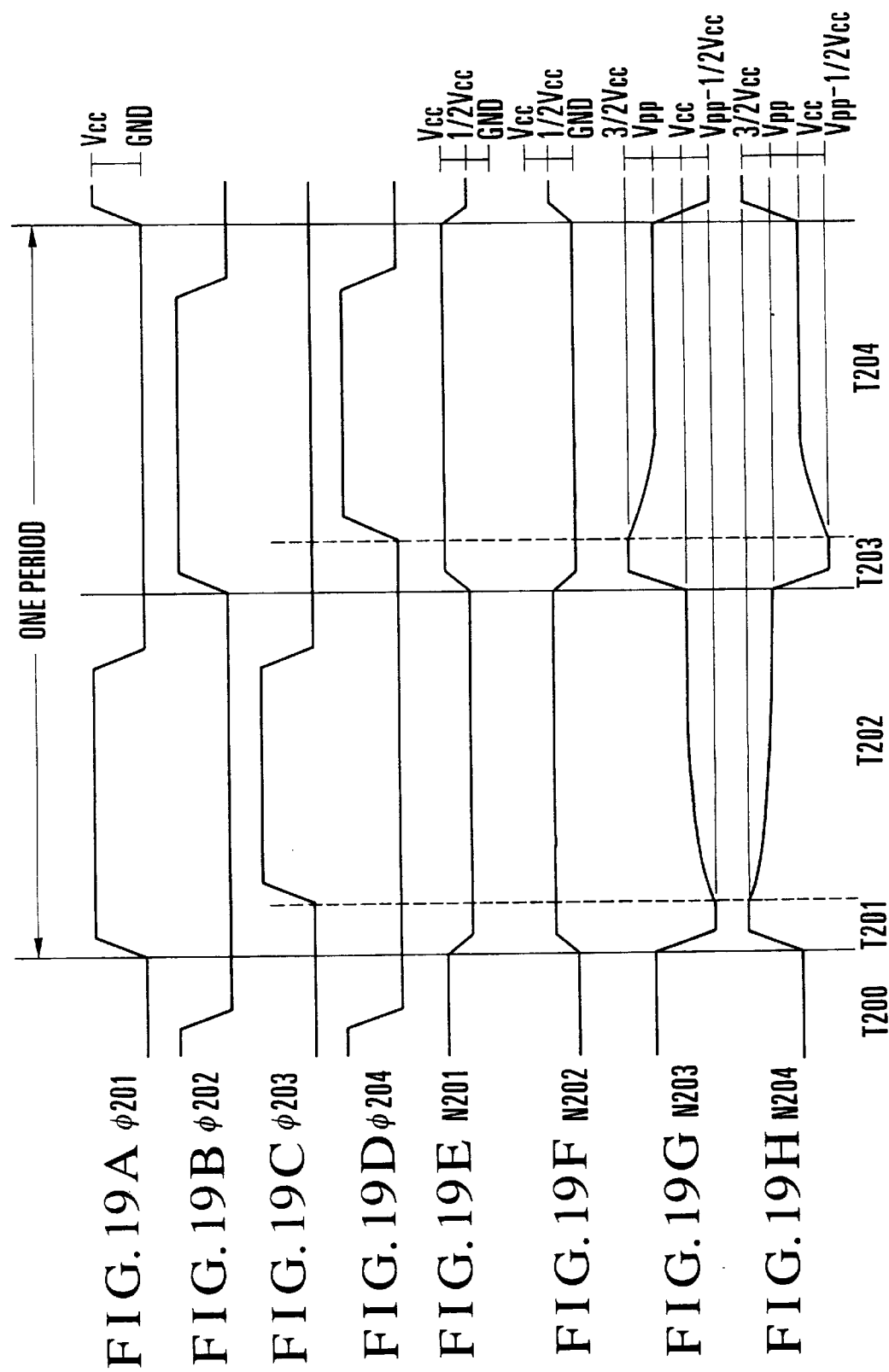

BOOSTER CIRCUIT

BACKGROUND OF THE INVENTION

The present invention relates to a booster circuit used for a flash memory or the like.

Generally, to write/erase data in/from a flash memory, channel hot electrons or a tunnel current is used. For this purpose, a high voltage is required because a high electric field must be applied to the gate. Conventionally, a terminal for supplying a high external voltage is arranged independently of the power supply terminal. In recent years, however, a single power supply is used to simplify the external power supply circuit. The power supply voltage to be supplied is conventionally often 5 V, though it is lowering to 2 or 3 V to reduce the power consumption or increase the operation speed. The memory chip incorporates a booster circuit for generating a voltage higher than the externally supplied power supply voltage, and recently, the boosting ratio need be higher than the conventional one.

FIG. 16 shows a booster circuit disclosed in Japanese Patent Laid-Open No. 9-8229 (to be referred to as prior art 1 hereinafter). This booster circuit comprises diodes D1 to D5, capacitors CP1 to CP4, a capacitive load CL, and driving circuits DV1 and DV2.

Referring to FIG. 16, a circuit constituted by, e.g., the diode D2 and the capacitor CP2 is called a pump circuit PC. The booster circuit shown in FIG. 16 has four pump circuits PC. Nodes between the diodes D1 to D4 and the one-terminal sides of the capacitors CP1 to CP4 are represented by N1 to N4, respectively; a node between the diode D5 and the load capacitor CL, NL; and nodes between the capacitors CP1 and CP2 and the output terminals of the driving circuits DV1 and DV2, N181 and N182, respectively.

Connection in the booster circuit shown in FIG. 16 will be described next. The anode side of the diode D1 is connected to the power supply, and the cathode side is connected to the capacitor CP1 through the node N1 to form the first pump circuit. The anode side of the diode D2 is connected to the node N1, and the cathode side is connected to the capacitor CP2 through the node N2 to constitute the second pump circuit. In a similar manner, a plurality of pump circuits, i.e., the third and fourth pump circuits respectively constituted by the diodes D3 and D4 and the capacitors CP3 and CP4 are connected in series.

The other terminal of each of the odd-numbered capacitors CP1 and CP3 counted from the first pump circuit is connected to the driving node N181. The other terminal of each of the even-numbered capacitors CP2 and CP4 counted from the first pump circuit is connected to the driving node N182.

A two-phase clock signal $\phi 181$ and a clock $\phi 182$ as the inverted signal of the clock $\phi 181$, which have timings as shown in FIGS. 17A and 17B, are supplied to the outputs, i.e., the driving nodes N181 and N182 of the driving circuits DV1 and DV2, respectively. The driving nodes N181 and N182 for the capacitors CP1 and CP3 and the capacitors CP2 and CP4 are alternately driven in opposite phases, thereby outputting a high voltage from an output terminal Voz. In the arrangement shown in FIG. 16, a voltage five times higher than a power supply voltage Vcc is obtained. Note that the capacitor CP is called a pump capacitance.

The operation of this circuit will be described next in more detail with reference to FIGS. 16, 17A, and 17B.

For the descriptive convenience, assume that the circuit is constituted by two pump circuits, the load capacitor CL is connected to the node N3, the power supply voltage Vcc is 4 V, the capacitors CP1 and CP2 have the same capacitance value as that of the load capacitor CL, the threshold value of the diodes D1 to D3 is 0 V, and low and high levels of the clocks $\phi 181$ and $\phi 182$ are 0 V and 4 V, respectively.

In the initial state at time T180, the driving nodes N181 and N182 are at 0 V, and the nodes N1, N2, and NL are at 4 V because the power supply voltage Vcc is supplied through the diodes D1 to D3. As a result, the output voltage Voz is also 4 V.

At time T181, the clock $\phi 181$ rises to set the driving node N181 at 4 V. The voltage at the node N1 temporarily changes from 4 V to 8 V and immediately stabilizes at 5.3 V because charges flow to the nodes N2 and NL through the diodes D2 and D3. This is because charges accumulated in the capacitor CP1 are distributed to the capacitor CP2 and the load capacitor CL.

The clock $\phi 182$ does not change, and the driving node N182 also maintains 0 V.

At time T182, the clock $\phi 181$ falls to set the driving node N181 at 0 V. Charges stored on the N181 side of the capacitor CP1, which correspond to 4 V, are removed through the driving circuit DV1.

Simultaneously, the voltage on the node N1 side of the capacitor CP1 lowers from 5.3 V to 1.3 V and then rises to 4 V because of supply of the power supply voltage Vcc through the diode D1. Letting C (F) be the electrostatic capacitance of the capacitor CP1, the loss charge amount due to this discharge is given by C×Vcc (coulomb).

On the other hand, the clock $\phi 182$ rises to set the driving node N182 at 4 V. The voltage on the node N2 side of the capacitor CP2 temporarily becomes 9.3 V because 4 V is added to 5.3 V. However, since the diode D3 is turned on to transfer charges to the load capacitor CL, the node N2 side stabilizes at 7.3 V, and the output voltage Voz also becomes 7.3 V.

At time T183, the clock $\phi 181$ rises again to repeat the same operation as at time T181.

On the other hand, when the clock $\phi 182$ falls, the driving node N182 is set at 0 V, and charges stored on the driving node N182 side of the capacitor CP2 are removed through the driving circuit DV2. Letting C (F) be the electrostatic capacitance of the capacitor CP2, the loss charge amount due to this discharge is given by C×Vcc (coulomb).

This boost operation is repeated, and the output terminal Voz finally converges to 12 V. Since discharge is performed twice in one period, the loss charge amount for one period is C×Vcc×2 (coulomb). Since Vcc is 4 V, the loss charge amount is 8C (coulomb).

In prior art 1, letting Z be the number of pump circuits, the boost voltage is generally given by (Z+1)×Vcc, and the loss charge amount is given by Z×C×Vcc (coulomb). Therefore, the loss charge amount per unit boost ratio is represented by $\{Z/(Z+1)\}\times C\times Vcc$ (coulomb).

FIG. 18 shows another conventional booster circuit (to be referred to as second prior art hereinafter) disclosed in "1996 Symposium on VLSI Circuits Digest of Technical Papers", pp. 110–111. FIG. 18 shows the circuit in mode 2. This booster circuit is of a full-wave rectification type and aims at increasing the current amount to be output from the booster circuit and reducing the power consumption by recycling some removed charges.

The booster circuit of prior art 2 comprises PMOS transistors M1 and M4, NMOS transistors M2, M3, M5, M6, M7, and M8, drivers DV201 and DV202 for inverting an input signal and outputting the inverted signal, diodes D201 and D202, and capacitors C201 to C204. Nodes between the transistors M1 and M2, between the transistors M2 and M3, between the transistors M5 and M7, and between the transistors M6 and M8 are represented by N201, N202, N203 and N205, respectively.

The connection relationship in the circuit of prior art 2 shown in FIG. 18 will be described.

A clock $\phi 201$ is connected to the gate of the transistor M2 and to the gate of the transistor M4 through the driver DV202. A clock $\phi 202$ is connected to the gate of the transistor M3 and to the gate of the transistor M1 through the driver DV201.

The source of the transistor M1 is connected to a power supply Vcc while the drain is connected to the drains of the transistors M2 and M4 and the capacitor C201 at the node N201. The source of the transistor M3 is connected to ground GND while the drain is connected to the sources of the transistors M2 and M4 and the capacitor C202 at the node N202.

Each of the nodes N203 and N204, i.e., the other terminal of each of the capacitors C201 and C202, is connected to the source of the corresponding one of the transistors M5 and M6 and the drain of the corresponding one of the transistors M7 and M8. The drains of the transistors M5 and M6 and the anodes of the diodes D201 and D202 are connected to the power supply Vcc. The cathode of the diode D201 is connected to the gates of the transistors M5 and M8 and the capacitor C203. The cathode of the diode D202 is connected to the gates of the transistors M6 and M7 and the capacitor C204. The other terminal of each of the capacitors C203 and C204 is connected to the corresponding one of clocks $\phi 203$ and $\phi 204$. The sources of the transistors M7 and M8 are connected to a load capacitor CL at a node NL.

The operation of prior art 2 will be described next with reference to the timing charts of FIGS. 19A to 19H.

For the descriptive convenience, in FIGS. 19A to 19H, assume that the power supply voltage Vcc is 4 V, and the capacitors C201 and C202 have the same capacitance value C (F) as that of the load capacitor CL. In addition, the threshold value of the transistors M1 to M8 is 0 V, and low and high levels of the clocks $\phi 201$ to $\phi 204$ are 0 V and 4 V, respectively.

The clocks $\phi 201$ to $\phi 204$ have the same frequency. The clock signals $\phi 201$ and $\phi 202$ have a phase difference corresponding to ½ the period, and so do the clock signals $\phi 203$ and $\phi 204$. The clock signals $\phi 203$ and $\phi 204$ go high when a predetermined time has elapsed after the clock signals $\phi 201$ and $\phi 202$ change to high level, respectively, and then simultaneously go low.

At transient time T200, assume that the node N201 is at 4 V (Vcc), the node N202 is at 0 V (GND), the node N203 is at about 5 V (Vpp), and the node N204 at 4 V (Vcc).

At time T201, since the clock signal $\phi 201$ goes high while the clock signal $\phi 202$ is at low level, the outputs from the driver DV201 and DV202 are at high and low levels, respectively. At this time, the transistors M1 and M3 are turned off, and the transistors M2 and M4 are turned on. Consequently, charges corresponding to 4 V which are stored on the node N201 side of the capacitor C201 move, through the transistors M2 and M4, to the node N202 side of the capacitor C202 which is being discharged to 0 V, so both the nodes N201 and N202 are set at 2 V (½×Vcc). On the other hand, charges corresponding to 5 V (Vpp) which are stored on the node N203 side of the capacitor C201 decrease by 2 V to 3 V (Vpp−½×Vcc). Charges corresponding to 2 V are added to the node N204 side of the capacitor C202 which is being charged to 4 V, so the node N204 is set at 6 V (3⁄2×Vcc).

At time T202, the clock signal $\phi 203$ goes high while the clock signal $\phi 201$ is at high level and the clock signal $\phi 202$ is at low level. The transistors M5 and M8 are turned on. As a result, the charges corresponding to 6 V (3⁄2×Vcc), which are stored on the node N204 side of the capacitor C202, are distributed to the load capacitor CL through the transistor M8, and the voltage converges to 5.5 V (Vpp). The node N203 side of the capacitor C201, which is being discharged to 3 V (Vpp−½×Vcc), is charged to 4 V, i.e., the power supply voltage Vcc through the transistor M5.

After this, the clocks $\phi 201$ and $\phi 203$ go low, and the transistors M2, M4, M5, and M8 are turned off. The voltage at each node is kept unchanged.

At time T203, the clock signal $\phi 202$ goes high, and the outputs from the drivers DV201 and DV202 are set at low and high levels, respectively. At this time, the transistors M1 and M3 are turned on, and the transistors M2 and M4 are turned off. The node N201 side of the capacitor C201 is charged to the power supply voltage Vcc of 4 V through the transistor M1. The node N202 side of the capacitor C202, which is being charged to 2 V, is set at GND, i.e., 0 V through the transistor M3.

On the node N203 side of the capacitor C201, which is being charged to 4 V, charges corresponding to 2 V are added to set the node N203 at 6 V (3⁄2×Vcc). On the node N204 side of the capacitor C202, which is being discharged to 5.5 V (Vpp), charges corresponding to 2 V are removed to set the node N204 at 3.5 V (Vpp−½×Vcc).

At time T204, the clock $\phi 204$ goes high while the clocks $\phi 201$ and $\phi 202$ are set at low and high levels, respectively, so the transistors M6 and M7 are turned on. As a result, charges corresponding to 6 V (3⁄2×Vcc), which are stored on the node N203 side of the capacitor C201, move to the load capacitor CL through the transistor M7 and the node NL, so the voltage converges to 5.75 V (Vpp). The node N204 side of the capacitor C202, which is being discharged to 3.5 V, is charged to the power supply voltage of 4 V through the transistor M6.

After this, the clocks $\phi 202$ and $\phi 204$ go low, and the transistors M1, M3, M6, and M7 are turned off. The voltage at each node is held.

By repeating this operation, the load capacitor CL is gradually charged to a higher voltage, and the output voltage Vpp finally converges to 6 V.

In the booster circuit of prior art 2, charges corresponding to the power supply voltage Vcc, which are stored in the capacitor C201, are distributed to the capacitor C202 through the transistors M2 and M4, and charges corresponding to ½×Vcc are stored in the capacitor C202. These charges are removed to the ground GND in response to the next clock. In this case, the loss charge amount for one period is C×Vcc/2 (coulomb). When Vcc is 4 V, the loss charge amount is 2C (coulomb). The loss charge amount per unit boost ratio is given by ⅓×C×Vcc (coulomb).

In the above-described booster circuit of prior art 1, the charge/discharge amount of the capacitor CP by switching is large, and charges corresponding to C×Vcc (coulomb) are lost per capacitor CP in one clock period. When four capacitors are arranged as in prior art 1, the loss becomes C×Vcc×4 (coulomb). This loss increases as the boost ratio of the booster circuit becomes high. Therefore, the power consumption of the circuit undesirably increases.

In the booster circuit of prior art 2, the pump circuit is connected to allow a bidirectional operation such that the boost operation is performed twice in one clock period, thereby increasing the current capacitance. In addition, since the transistors M2 and M4 are arranged, charges stored in the capacitor C201 are not grounded but used to charge the capacitor C202, and then the capacitor C202 is discharged. With this arrangement, the loss charge amount can be reduced, and consequently, the power consumption of the booster circuit can be decreased.

In the booster circuit of prior art 2, however, the voltage at the driving nodes N201 and N202 changes only by Vcc/2. Charges corresponding to only Vcc/2 can contribute to the boost operation, so no high voltage can be obtained. Therefore, the booster circuit of prior art 2 cannot be used for a write/erase in/from a flash memory because the voltage is too low, although it can be used as a write voltage for a memory cell of a DRAM.

In addition, the node N201 of the capacitor C201 must be switched between 0 V and 4 V by the transistors M1 and M2. The node N203 must be driven by the transistors M5 and M8 with a gate voltage of 2×Vcc, i.e., 8 V by using the capacitor C203 and the diode D201 to decrease the ON resistance of the transistors M5 and M8, and be switched at a voltage higher than the power supply voltage. In this circuit arrangement, the number of devices increases, resulting in a complex circuit arrangement.

Furthermore, prior art 2 does not disclose an arrangement for realizing a boost ratio of 3 or more. As one arrangement for realizing a boost ratio of 3 or more, a plurality of booster circuits of prior art 2 are prepared, and the output from an output terminal OUT of a preceding stage is supplied to the power supply terminal Vcc of the next stage. However, since the voltage becomes high toward the last stage, the breakdown voltage of a transistor M or diode D to be used must be increased. This increases the size of each device, although the number of devices per stage is large to already result in a large chip size.

SUMMARY OF THE INVENTION

It is the first object of the present invention to provide a booster circuit which reduces the loss charge amount due to discharge and decreases the power consumption even at a high boost ratio.

It is the second object of the present invention to provide a booster circuit capable of realizing a high boost ratio with a simple circuit having a small number of devices while reducing the loss charge amount due to discharge.

In order to achieve the above objects, according to the present invention, there is provided a booster circuit comprising a first pump circuit having a first rectifying device, the first rectifying device having one terminal to which a voltage is supplied and the other terminal connected to a first capacitor through a first connection point, a second pump circuit having a second rectifying device, the second rectifying device having one terminal connected to the first connection point and the other terminal connected to a second capacitor through a second connection point, a node driving circuit for outputting a driving signal to a driving node on an opposite side of the connection point of each of the capacitors, switch means connected to the driving nodes of the capacitors, and control means for driving the switch means to control a potential of each of the capacitors, wherein the voltage supplied to the first capacitor is boosted, and the boosted voltage is output through the first and second connection points.

BRIEF DESCRIPTION OF THE DRAWINGS

FIG. 1 is a block diagram showing a booster circuit according to the first embodiment of the present invention;

FIG. 5 is a circuit diagram showing the second arrangement of the node driving circuit;

FIG. 8 is a circuit diagram showing a booster circuit according to the third embodiment;

FIG. 12 is a circuit diagram showing a booster circuit according to the seventh embodiment;

FIG. 16 is a circuit diagram showing a conventional booster circuit;

FIGS. 17A and 17B are timing charts showing the operations of various portions of the circuit shown in FIG. 16;

FIGS. 19A to 19H are timing charts showing the operations of various portions of the circuit shown in FIG. 18.

DESCRIPTION OF THE PREFERRED EMBODIMENTS

Figure 2:
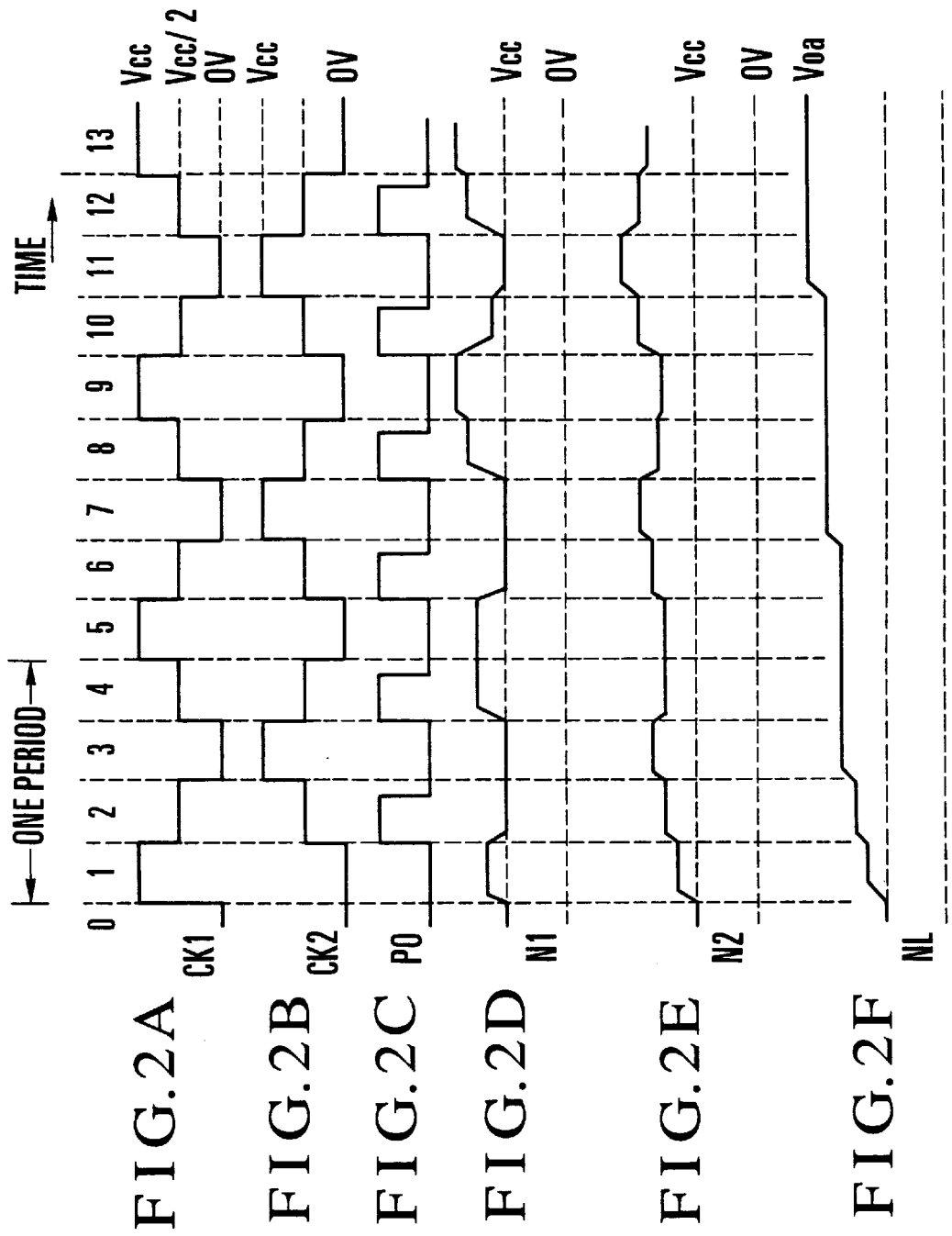
FIGS. 2A to 2F are timing charts showing the operation of the booster circuit.

The present invention will be described with reference to FIGS. 1 to 4G.

FIG. 1 shows a booster circuit according to the first embodiment of the present invention. Referring to FIG. 1, reference numeral 10 denotes a node driving circuit for generating clock signals CK1 and CK2 to drive driving nodes n1 and n2. Reference symbols D1 to D3 denote diodes; CP1 and CP2, capacitors; CL, a load capacitor; and TSW1, a switch opened/closed by a control signal P0. A pump circuit PC is constituted by a diode and a capacitor. The booster circuit shown in FIG. 1 uses two pump circuits. Reference symbol N1 denotes a node corresponding to the connection point between the diode D1 and the capacitor CP1; N2, a node corresponding to the connection point between the diode D2 and the capacitor CP2; and n1 and n2, driving nodes between the capacitor CP1 and the node driving circuit 10 and between the capacitor CP2 and the node driving circuit 10.

Connection in the booster circuit shown in FIG. 1 will be described next.

The anode of the diode D1 is connected to a power supply Vcc while the cathode is connected to the capacitor CP1 and the diode D2 through the node N1. The cathode of the diode D2 is connected to the capacitor CP2 and the diode D3 through the node N2. The cathode of the diode D3 is connected to the load capacitor CL through a node NL. The outputs CK1 and CK2 from the node driving circuit 10 are connected to the capacitors CP1 and CP2 through the driving nodes n1 and n2, respectively. The opening and closing terminals of the switch TSW1 are connected to the driving nodes n1 and n2, respectively. The control signal P0 for controlling opening/closing is input to the control terminal of the switch TSW1.

FIGS. 2A to 2F are timing charts showing the operation timings of various portions of the booster circuit shown in FIG. 1. The operation of this circuit will be described in detail with reference to FIGS. 1 and 2A to 2F.

For the descriptive convenience, assume that the power supply voltage Vcc is 4 V, the capacitors CP1 and CP2 have the same capacitance value C (F) as that of the load capacitor CL, the threshold value of the diodes D1 to D3 is 0 V, and the low and high levels of the clocks CK1 and CK2 are 0 V and 4 V, respectively.

The clocks CK1 and CK2 have the same frequency and a phase difference corresponding to ½ the period. The high- or low-level period is equal to or shorter than ¼ the period. When the clocks CK1 and CK2 change from high level to low level or from low -Level to high level, the driving nodes n1 and n2 are set in a floating state (FIGS. 2A and 2B).

The control signal P0 has a frequency twice that of the clocks CK1 and CK2 and is set at high level when the clocks CK1 and CK2 are in the floating state. The high-level period of the control signal P0 does not overlap the high- or low-level period of the clocks CK1 and CK2 (FIG. 2C).

At time T0, the clocks CK1 and CK2 are at 0 V. The nodes N1 and N2 and an output voltage Voa are at 4 V because the diodes D1 to D3 are turned on to supply the power supply voltage to the capacitors CP1, CP2, and CL. Therefore, the output voltage Voa is 4 V.

At time T1, when the clock CK1 rises to 4 V, the node N1 which is charged to 4 V in the initial state temporarily changes to 8 V because 4 V of the clock CK1 is added. Immediately after this, charges move to the side of the nodes N2 and NL through the diodes D2 and D3, and charges corresponding to 4 V added to the capacitor CP1 are distributed to the capacitors CP2 and CL, so the node N1 stabilizes at 5.3 V (FIG. 2D).

Immediately before time T2, charges corresponding to 4 V are stored on the driving node n1 side of the capacitor CP1, and charges corresponding to 0 V are stored on the driving node n2 side of the capacitor CP2.

At time T2, the control signal P0 goes high to close the switch TSW1. Charges corresponding to 4 V, which are stored in the capacitor CP1, move to the driving node n2 side of the capacitor CP2 through the switch TSW1, so both the driving nodes n1 and n2 are set at 2 V. At this time, only charge movement occurs, and no charge loss, i.e., no power consumption is generated.

In response to this, charges corresponding to 2 V are removed from 5.3 V at the node N1, so the node N1 is set at a lower voltage of 3.3 V. However, the node N1 is charged by the power supply Vcc through the diode D1, so the voltage stabilizes at the Vcc level of 4 V (FIG. 2D). The voltage at the node N2 rises from 5.3 V to 7.3 V and then stabilizes at 6.3 V because charges in the capacitor CP2 are distributed to the load capacitor CL through the diode D3 (FIG. 2E). Therefore, the output voltage Voa also becomes 6.3 V (FIG. 2F). Since the node N1 is at 4 V, charge transfer to the capacitor CP1 side is inhibited by the diode D2.

At time T3, the clock CK1 is set at 0 V. Charges corresponding to 2 V on the node n1 side of the capacitor CP1 are removed through the CK1 terminal, so the voltage at the node N1 lowers from 4 V to 2 V. Immediately after this, the node N1 is charged by the power supply Vcc through the diode D1, so the voltage stabilizes at the Vcc level of 4 V (FIG. 2D).

When the clock CK2 is set at 4 V, the driving node n2 is charged from 2 V to 4 V, and the voltage at the node N2 rises from 6.3 V to 8.3 V. These charges are distributed to the load capacitor CL through the diode D3 and the node NL, and the voltage at the node N2 stabilizes at 7.3 V (FIG. 2E). Therefore, the output voltage Voa also becomes 7.3 V (FIG. 2F).

Immediately before time T4, charges corresponding to 0 V are stored at the driving node n1, and charges corresponding to 4 V are stored at the driving node n2.

At time T4, the driving nodes n1 and n2 are electrically connected to move charges corresponding to 4 V at the driving node n2 to the driving node n1 side. Therefore, both the driving nodes n1 and n2 are set at 2 V. Charges corresponding to 2 V are added to the node N1 at 4 V, so the voltage at the node N1 increases to 6 V and then stabilizes at 5.7 V because the charges are distributed to the capacitor CP2 through the diode D2 (FIG. 2D).

Since the voltage at the driving node n2 changes from 4 V to 2 V, the voltage at the node N2 lowers from 7.3 V to 5.3 V and then stabilizes at 5.7 V because the charges are distributed from the capacitor CP1, as described above (FIG. 2E). Since the node NL is at 7.3 V, charge transfer to the load capacitor CL side is inhibited by the diode D3, so the voltage of 7.3 V is maintained (FIG. 2F).

In the periods from time T5 to time T8 and from time T9 to time T12, the same operation as that from time T1 to time T4 is repeated. However, generation of charge movement to each node depends on the potential relationship between the nodes N1, N2, and NL.

With such a periodical operation, charges are sequentially accumulated in the load capacitor CL. Finally, the output voltage Voa becomes 12 V. That is, a voltage three times higher than the power supply voltage Vcc can be obtained using the two pump circuits.

In addition, the period when the driving nodes n1 and n2 are electrically connected is set while the outputs from the node driving circuit 10, i.e., the clocks CK1 and CK2 are being inverted. With this arrangement, ½ the charges removed from the capacitor CP can be recycled as charges to be stored. For this reason, the power consumption of the booster circuit in obtaining a high voltage can be reduced.

In the first embodiment, charges corresponding to C×Vcc/2 (coulomb) are lost for each capacitor CP in one period. This embodiment employs the two-stage structure, and the operation is performed twice in one period. For this reason, charges corresponding to Vcc×C (coulomb) can be saved.

In this embodiment, letting G be the number of pump circuits, the boost voltage is generally given by (G+1) x Vcc, and the loss charge amount for one period is given by G×C×Vcc/2 (coulomb). Therefore, the loss charge amount per unit boost ratio is given by {G/2(G+1)}×C×Vcc (coulomb).

In comparison to prior art 1 in which the loss charge amount for one period is 2×C×Vcc (coulomb), 50% of the charges can be saved in this embodiment. In addition, in this embodiment, the loss charge amount for one period is twice higher than that of prior art 2, although a voltage twice or more higher can be obtained, and the loss charge amount per boost ratio is equal to that of prior art 2. Furthermore, since the output switching transistors M7 and M8, the gate voltage boosting diodes D201 and D202, and the capacitors C203 and C204 can be omitted, the circuit arrangement is simplified, and the number of devices can be decreased.

The period of the clocks CK1 and CK2 can be set to be four or more times the time constant necessary until charges in the capacitors CP1 and CP2 are transferred through the diodes D1 to D3 and converge to a desired level. The period when the control signal P0 of the switch TSW1 is at high level can be set to be equal to or longer than the time constant necessary until charges in the capacitors CP1 and CP2 are transferred through the switch TSW1 and converge to a desired level.

Figure 3:
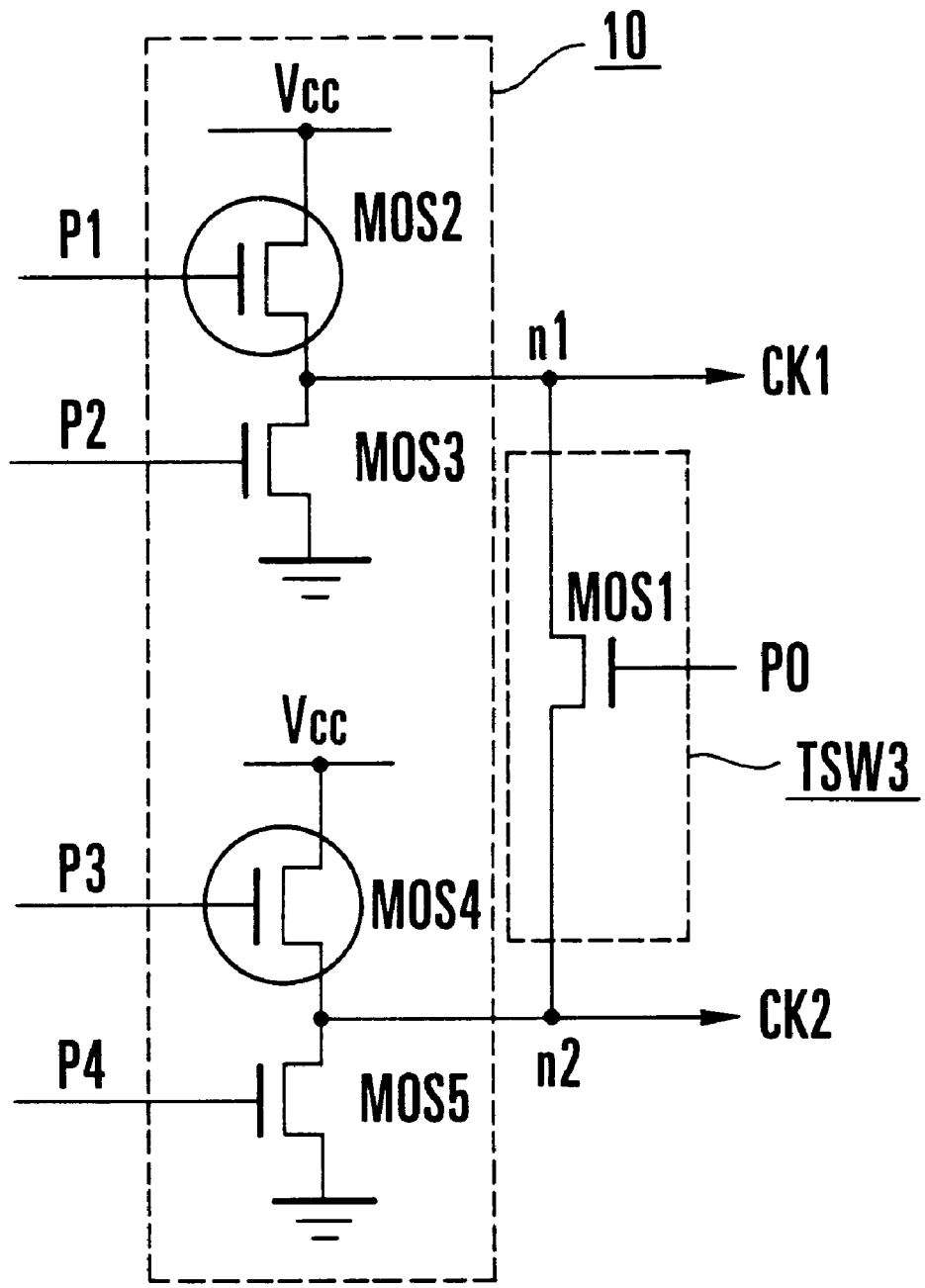
FIG. 3 is a circuit diagram showing the first arrangement of a node driving circuit used in the booster circuit.
Figure 4:
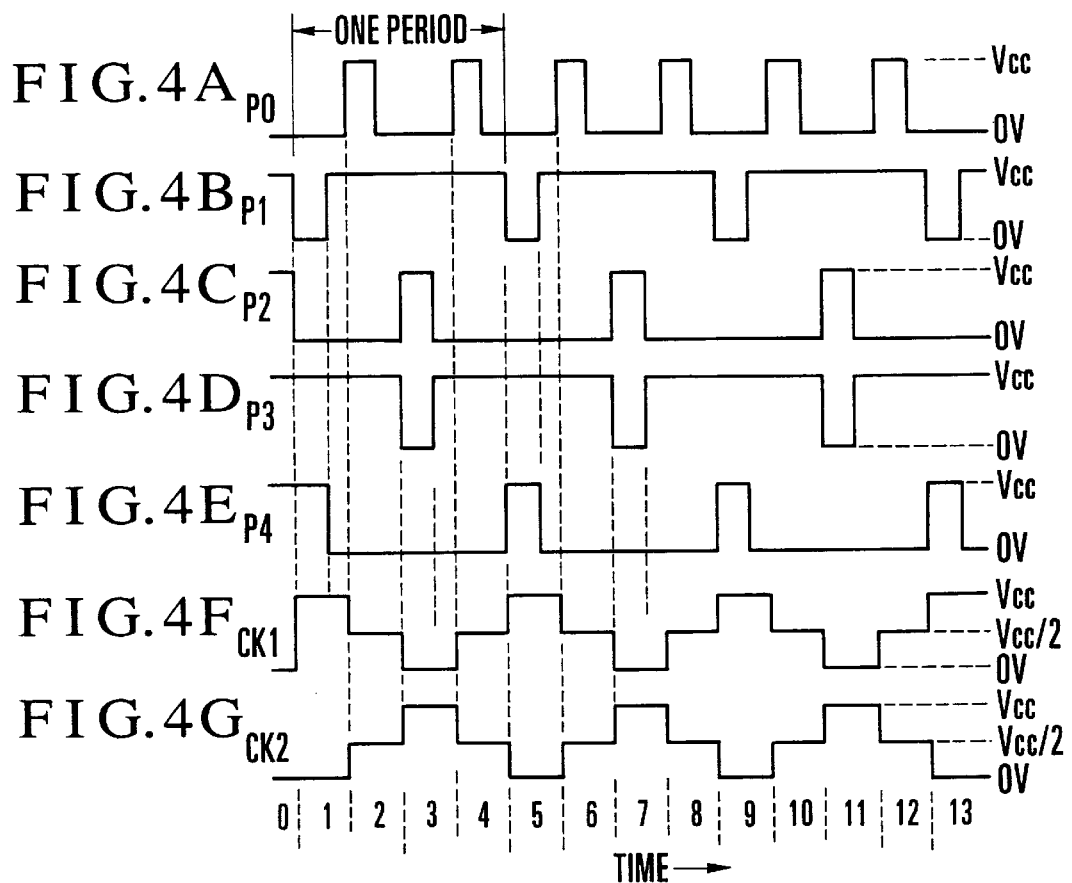
FIGS. 4A to 4G are timing charts showing the operation of the node driving circuit shown in FIG. 3.

FIG. 3 shows the first arrangement of the node driving circuit 10. The node driving circuit 10 is constituted by a CMOS driver. In FIG. 3, the node driving circuit 10 has transistors MOS2 to MOS5. The transistors MOS2 and MOS4 are PMOS transistors, and the remaining transistors are NMOS transistors. Encircled transistors in FIG. 3 are PMOS transistors, and the remaining transistors are NMOS transistors. In FIG. 3, Vcc indicates the power supply voltage; and P0 to P4, control signals to be supplied to the gates of the transistors. The clocks CK1 and CK2 correspond to the output signals from the node driving circuit 10. FIGS. 4A to 4G show the timing charts.

Referring to FIG. 3, the sources of the PMOS transistors MOS2 and MOS4 are connected to the power supply Vcc while the gates are connected to the signals P1 and P3, and the drains are connected to the driving nodes n1 and n2. The drains of the NMOS transistors MOS3 and MOS5 are connected to the driving nodes n1 and n2 while the gates are connected to the signals P2 and P4, and the sources are connected to the ground GND.

The drain and source of the NMOS transistor MOS1 are connected between the driving nodes n1 and n2 as a switch TSW3. The control signal P0 for ON/OFF-controlling the switch TSW3 is connected to the gate of the transistor MOS1.

The operation of the node driving circuit 10 will be described in detail with reference to FIGS. 3 and 4A to 4G.

As shown in FIGS. 4B to 4E, the control signals P1 to P4 have the same frequency and repeat the input timings to the corresponding transistors at a period from time T1 to time T4. The signals P1 and P4 have opposite phases, and so do the signals P2 and P3. In addition, the signals P1 and P2 have opposite phases and a phase difference corresponds to ½ the period, and so do the signals P3 and P4. The period when the signal P1 or P3 is at low level or while the signal P2 or P4 is at high level is set to be equal to or shorter than ¼ one period. This period is set such that charge/discharge to/from the capacitor CP is properly performed.

As shown in FIG. 4A, the control signal P0 goes high twice in a period, and one high-level period is equal to or shorter than ¼ one period. When conditions for setting the signals P1 and P3 at high level and the signals P2 and P4 at low level are satisfied, the control signal P0 goes high. When the signal P0 is at high level, the signals P1 and P3 cannot go low or the signals P2 and P4 cannot go high.

At time T0 in the initial state, both the clocks CK1 and CK2 are at low level.

At time T1, since the signals P1 and P2 are at low level, and the signals P3 and P4 are at high level (FIGS. 4A to 4E), the transistors MOS2 and MOS5 are turned on, and the transistors MOS3 and MOS4 are turned off. The clock CK1 goes high, and the clock CK2 goes low (FIGS. 4F and 4G).

After time T1, even when the signals P1 and P2 are inverted to high level, and the signals P3 and P4 are inverted to low level, the discharge amounts of the clocks CK1 and CK2 are small. The clock CK1 maintains high level, and the clock CK2 maintains low level. This state will be referred to as a floating output state hereinafter.

At time T2, the control signal P0 goes high (FIG. 4A). The transistor MOS1 is turned on to move charges between the driving nodes n1 and n2. Both the driving nodes n1 and n2 are set at an intermediate potential between them (FIGS. 4F and 4G). This intermediate potential will be referred to as a Vcc/2 level hereinafter. However, when the capacitors CP1 and CP2 have different capacitance values, or stored charge amounts are different, the driving nodes n1 and n2 are not always set at Vcc/2 (V). In this state, even when the control signal P0 is set at low level to turn off the transistor MOS1, the level at the driving nodes n1 and n2 is kept unchanged because of the floating output state.

At time T3, since the signals P1 and P2 are at high level, and the signals P3 and P4 are at low level (FIGS. 4A to 4E), the transistors MOS3 and MOS4 are turned on, and the transistors MOS2 and MOS5 are turned off. The clock CK1 goes low, and the clock CK2 goes high (FIGS. 4F and 4G).

After time T3, even when the signals P1 and P2 are inverted to high level, and the signals P3 and P4 are inverted to low level, the discharge amounts of the clocks CK1 and CK2 are small. The clock CK1 maintains low level, and the clock CK2 maintains high level (floating output state).

At time T4, the control signal P0 goes high (FIG. 4A). Charges move between the driving nodes n1 and n2, and the potential at the driving nodes n1 and n2 is set at Vcc/2 level (FIGS. 4F and 4G).

In this state, even when the control signal P0 is set at low level to turn off the transistor MOS1, the levels of the clocks CK1 and CK2 are kept; unchanged (floating output state).

From time T5, the operation from time T1 to time T4 is repeated.

FIG. 5 shows the second arrangement of the node driving circuit 10.

In FIG. 5, two circuits called clocked inverters respectively constituted by transistors MOS12 to MOS15 and transistors MOS16 to MOS19 are used, and connection/disconnection between the outputs from these circuits is controlled by a transistor MOS11. The transistor MOS11 corresponds to the transistor MOS1 in FIG. 3.

Referring to FIG. 5, the gates and drains of the PMOS transistors MOS13 and MOS17 are commonly connected, and so do the NMOS transistors MOS14 and MOS18 to constitute a CMOS inverter. The outputs from the CMOS inverter are connected to the nodes n1 and n2, respectively.

The sources of the PMOS transistors MS012 and MOS16 are connected to the power supply Vcc while the gates are connected to control signals P11 and P13, and the drains are connected to the CMOS inverters, respectively. The drains of the NMOS transistors MOS15 and MOS19 are connected to the CMOS inverters while the gates are connected to control signals P12 and P14, respectively, and the sources are connected to the ground GND.

The drain and source of the NMOS transistor MOS11 are connected between the driving nodes n1 and n2 as a switch TSW5. A control signal P10 for ON/OFF-controlling the switch TSW5 is connected to the gate of the transistor MOS11.

FIGS. 6A to 6G show the timings of the control signals P10 to P16 supplied to the node driving circuit shown in FIG. 5.

Figure 6:
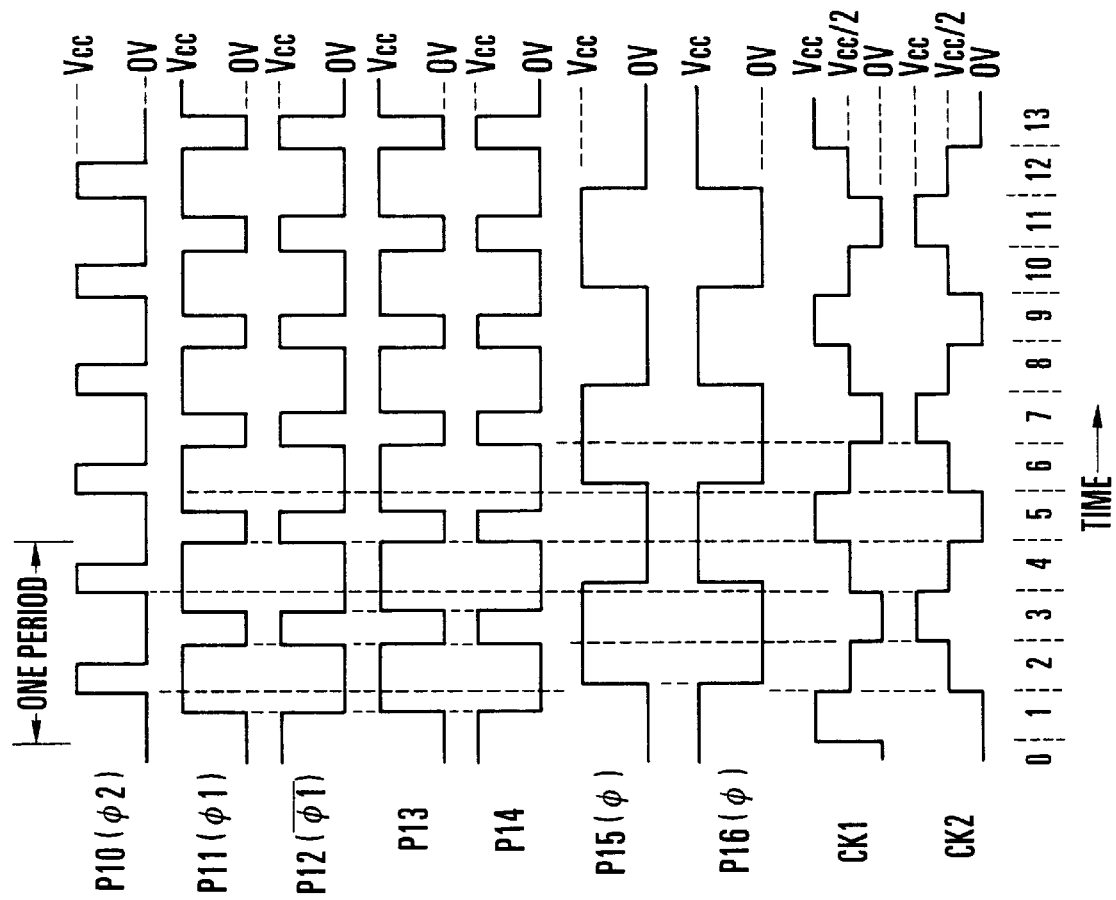
FIGS. 6A to 6I are timing charts showing the operation of the node driving circuit shown in FIG. 5.

The signals P15 and P16 have the same frequency and opposite phases. The high-level period corresponds to ½ the period (FIGS. 6F and 6G). One clock of the signals P15 and P16 is set as one period. The signals P11 and P13 have the same frequency and go low twice in one period (FIGS. 6B and 6D). The signals P12 and P14 have the same frequency and an amplitude opposite to that of the signals P11 and P13 and go high twice in one period (FIGS. 6C and 6E).

The control signal P10 goes high before and after the signals P15 and P16 are inverted, i.e. goes high twice in one period. The high-level period of the signals P11 and P13 or the low-level period of the signals P12 and P14 includes the high-level period of the control signal P10 and long. In this period, the outputs from the node driving circuit 10 are set in the floating state.

The high-level period of the control signal P10 does not overlap the low-level period of the signals P11 and P13 and the high-level period of the signals P12 and P14.

The operations of the node driving circuit and the switch TSW5 in FIG. 5 will be described next with reference to the timing charts of FIGS. 6A to 6I.

At time T1, since the signals P11, P13, and P15 are at low level, and the signals P12, P14, and P16 are at high level, the transistors MOS12, MOS13, MOS15, MOS16, MOS18, and MOS19 are turned on, and the transistors MOS14 and MOS17 are turned off. For this reason, the clock CK1 goes high, and the clock CK2 goes low.

At the end of time T1, when the signals P11 and P13 go high, and the signals P12 and P14 go low, the transistors MOS12, MOS15, MOS16, and MOS19 are turned off. Although the floating output state is set, the levels of the clocks CK1 and CK2 are kept unchanged.

At time T2, the signal P10 goes high. When the transistor MOS11 constituting the switch TSW5 is turned on, the nodes n1 and n2 are electrically connected, so the clocks CK1 and CK2 are set at the Vcc/2 level.

At the end of time T2, even when the signal P10 goes low, the levels of the clocks CK1 and CK2 are kept unchanged because of the floating output state.

At time T3, since the signals P11, P13, and P16 are at low level, and the signals P12, P14, and P15 are at high level, the transistors MOS12, MOS14, MOS15, MOS16, MOS17, and MOS19 are turned on, and the transistors MOS13 and MOS18 are turned off. For this reason, the clock CK1 goes low, and the clock CK2 goes high.

At the end of time T3, when the signals P11 and P13 go high, and the signals P12 and P14 go low, the transistors MOS12, MOS15, MOS16, and MOS19 are turned off. Although the floating output state is set, the levels of the clocks CK1 and CK2 are kept unchanged.

At time T4, the signal P10 goes high. The transistor MOS11 constituting the switch TSW5 is turned on to electrically connect the nodes n1 and n2, so the clocks CK1 and CK2 are set at the Vcc/2 level.

At the end of time T4, even when the signal P10 goes low, the levels of the clocks CK1 and CK2 are kept unchanged because of the floating output state.

From time T5, the operation from time T1 to time T4 is repeated.

In FIGS. 5 and 6A to 6I, as the first modification, the control signals P11 and P12 may be used as the control signals P13 and P14, respectively. In addition, the inverted signal of the control signal P15 may be used as the control signal P16. Furthermore, the AND of the control signal P11 and the inverted signal of the control signal P12 may be used as the control signal P10.

As the second modification, the inverted signals of the control signals P11, P13, and P15 may be used as the control signals P12, P14, and P16, respectively. In addition, the control signal P11 may be used as the control signal P10.

As the third modification, the control signal P12 may be the control signal P14 or the inverted signal of the control signal P11. The control signal P11 may be used as the control signal P13, and the inverted signal of the control signal P15 may be used as the control signal P16. In addition, the control signal P11 may be used as the control signal P10.

Figure 7:
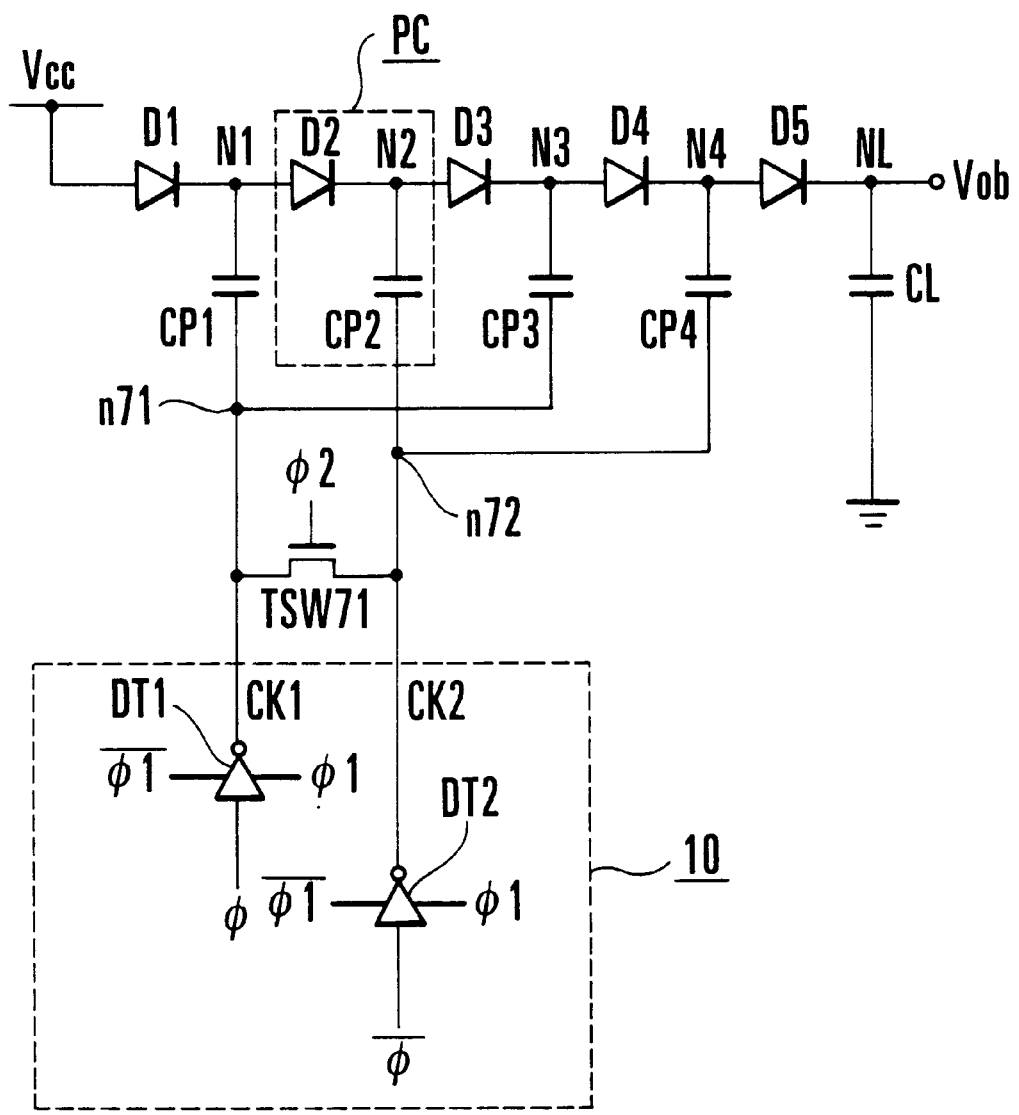
FIG. 7 is a circuit diagram showing a booster circuit according to the second embodiment.

FIG. 7 shows a booster circuit of the second embodiment. An even number of, i.e., four pump circuits PC each constituted by a diode D and a capacitor CP are connected. The driving nodes of odd-numbered pump circuits, i.e., in FIG. 7, the driving node of a pump circuit constituted by a diode D1 and a capacitor CP1 and that of a pump circuit constituted by a diode D3 and a capacitor CP3 are connected at a driving node n71. The driving nodes of even-numbered pump circuits, i.e., in FIG. 7, the driving node of a pump circuit constituted by a diode D2 and a capacitor CP2 and that of a pump circuit constituted by a diode D4 and a capacitor CP4 are connected at a driving node n72. The driving nodes 71 and 72 are connected to the two terminals of a switch TSW71. Opening/closing of the switch TSW71 is controlled by a clock $\phi 2$. This clock $\phi 2$ corresponds to the above-described control signal P0 or P10. A node driving circuit 10 is constituted by drivers DT1 and DT2 and has the same internal arrangement as that shown in FIG. 5. The timing charts of this node driving circuit are the same as those of FIGS. 6A to 6I. A signal $\phi 1$ corresponds to the signal P11 in FIG. 6B, and a signal $\phi$ corresponds to the signal P15 in FIG. 6F.

The connection relationship in the booster circuit shown in FIG. 7 will be described. The anode side of the diode D1 is connected to a power supply Vcc while the cathode side is connected to the capacitor CP1 through a node N1, thereby constituting the first pump circuit. The anode side of the diode D2 is connected to the node N1 while the cathode side is connected to the capacitor CP2 through a node N2, thereby constituting the second pump circuit. In a similar manner, a plurality of pump circuits, i.e., the third and fourth pump circuits respectively constituted by the diodes D3 and D4 and the capacitors CP3 and CP4 are connected in series.

The other end of each of the odd-numbered capacitors CP1 and CP3 counted from the first pump circuit is connected to the driving node n71. The other end of each of the even-numbered capacitors CP2 and CP4 counted from the first pump circuit is connected to the driving node n72.

The driving nodes n71 and n72 are connected by the switch TSW71. The clock $\phi 2$ is applied to the gate of the switch TSW71. The driving nodes n71 and n72 are connected to the outputs from the drivers DT1 and DT2 of the node driving circuit 10 and driven by clocks CK1 and CK2 output from the drivers DT1 and DT2.

The operation of the booster circuit shown in FIG. 7 will be described next with reference to the timing charts of FIGS. 6A to 6I.

For the descriptive convenience, assume that the power supply voltage Vcc is 4 V, the capacitors CP1 to CP4 have the same capacitance value as that of a load capacitor CL, the threshold value of the diodes D1 to D5 is 0 V, and the low and high levels of the clocks CK1 and CK2 are 0 V and 4 V, respectively, as in FIG. 1. The frequency of the clocks CK1 and CK2 and the phase difference therebetween are the same as those shown in FIGS. 6H and 6I. When the clock CK1 or CK2 changes from high level to low level or from low level to high level, the driving nodes n71 and n72 are set in a floating state by the signals φ1 and φ1 (bar) (the inverted signal of φ will be referred to as $\bar{\phi}$ hereinafter). The control signal φ2 has a frequency twice higher than that of the clocks CK1 and CK2 and goes high when the clocks CK1 and CK2 are set in the floating state. The high-level period of the control signal φ2 does not overlap the high- and low-level periods of the clocks CK1 and CK2.

The operation at transient times T5 to T8 will be described below.

At time T5 in FIGS. 6A to 6I, the clock CK1 of the node driving circuit 10 goes high (4 V), and the clock CK2 does low (0 V). When the clock CK1 changes to 4 V, the voltage at the driving node n71 changes from 2 V to 4 V. This voltage difference of 2 V is added to nodes N1 and N3. If the potential at the node N1 is higher than that at the node N2, or if the potential at the node N3 is higher than that at a node N4, charges at the node N1 or N3 immediately move to the node N2 or the nodes N4 and NL side. As a result, charges corresponding to 2 V added to the capacitors CP1 and CP3 are distributed to the capacitors CP2, CP4, and CL, thus boosting an output voltage Vob.

When the clock CK2 changes to 0 V, the voltage at the driving node n72 lowers from 2 V to 0 V. The voltage difference of 2 V is subtracted from the nodes N2 and N4. If the potential at the node N2 is lower than that at the preceding node N1 or if the potential at the node N4 is lower than that at the preceding node N3, charges are immediately transferred from the node N1 or N3 to boost the voltage.

The charges corresponding to 2 V, which are stored in the capacitors CP2 and CP4, are removed through the driver DT2. The loss charge amount is C×Vcc/2×2, i.e., C×Vcc.

At time T6, when the switch TSW71 is closed, charges on the driving node n71 side of the capacitors CP1 and CP3 move to the driving node n72 side of the capacitors CP2 and CP4 through the switch TSW71, so the driving nodes n71 and n72 are set at 2 V. At this time, only charge movement occurs, and no charge loss, i.e., no power consumption is generated.

Accordingly, the voltage at the nodes N1 and N3 lowers because of removal of charges corresponding to 2 V. However, since the nodes N1 and N3 are charged by the power supply Vcc or capacitors at the preceding stages through the diodes D1 and D3, the voltage at the node N1 and N3 does not become lower than 4 V. The voltage at the nodes N2 and N4 increases and then stabilizes at a predetermined level because charges in the capacitor CP2 are distributed to the node N3 side, and charges in the capacitor CP4 are distributed to the load capacitor CL, so the voltage stabilizes at a predetermined level. Therefore, the output voltage Vob is also set at a predetermined level and maintains this voltage by the load capacitor CL.

At time T7, when the clock CK1 is set at 0 V, charges on the driving nodes n71 and n72 sides of the capacitors CP1 and CP3, which correspond to 2 V, are removed through the driver DT1, so the voltage at the node N1 and N3 lowers by 2 V. However, the nodes N1 and N3 are charged from the power supply Vcc and the capacitors at the preceding stages through the diodes DI and D3, so the voltage does not become lower than 4 V. n , On the other hand, when the clock CK2 is set at 4 V, the driving node n72 is charged from 2 V to 4 V, so the voltage at the nodes N2 and N4 rises. If the voltage is higher than the potential at the subsequent stage, charges at the node N2 are distributed to the node N3 side, and charges at the node N4 are distributed to the load capacitor CL on the node NL side through the diode D5, so the voltage stabilizes at a predetermined level. Therefore, the output voltage Vob is also set at the predetermined level and maintains this level by the load capacitor CL.

Charges stored in the capacitors CP1 and CP3, which correspond to 2 V, are removed through the driver DT2, so the loss charge amount is C×Vcc/2×2, i.e., C×Vcc.

At time T8, the driving nodes n71 and n72 are electrically connected by the switch TSW71. Charges at the driving node n72, which correspond to 4 V, move to the driving node n71 side, so both the driving nodes n71 and n72 are set at 2 V. The voltage at the nodes N1 and N3 rises by 2 V. If the voltage is higher than the voltage at the subsequent nodes N2 and N4, charges move to the node N4 and NL sides, and the voltage stabilizes at a predetermined level.

Since the voltage at the driving node n72 changes from 4 V to 2 V, the voltage level at the nodes N2 and N4 lowers by 2 V. However, if the voltage is lower than that at the subsequent nodes N1 and N3, charges are distributed from the capacitors CP1 and CP3, as described above, so the voltage level increases.

As described above, the voltage at the nodes N2 to N4 and the output voltage Vob at the node NL rise in accordance with the operation from time T5 to time T8. The reverse flow of charges at the nodes N2 to N4 and NL to the pump circuit sides at the preceding stages is inhibited by the diodes D2 to D5, respectively, and the high voltage is held.

From time T9, the same operation as that from time T5 to time T8 is repeated, and finally, a voltage five times higher than the power supply voltage Vcc can be obtained at the node NL.

In the booster circuit shown in FIG. 7, by controlling the voltage at the driving nodes n71 and n72 by the outputs from the drivers DT1 and DT2 in the node driving circuit 10, respectively, a voltage five times higher than the power supply voltage Vcc can be obtained as the output voltage Vob. That is, letting m be the number of pump circuits, a voltage (m+1) times higher than the power supply voltage can be obtained.

When the switch TSW71 is closed to electrically connect the driving nodes n71 and n72, charges in the capacitors CP1 and CP3 or charges in the capacitors CP2 and CP4 are transferred to the other side before discharge, so the loss charge amount due to discharge can be halved. In this embodiment, the loss charge amount for one period is 2×C×Vcc (coulomb).

FIG. 8 shows a booster circuit of the third embodiment.

In the booster circuit shown in FIG. 8, an odd number of pump circuits are connected, and in this example, five pump circuits are connected. With this arrangement, a voltage six times higher than a power supply voltage Vcc can be obtained as an output voltage Voc.

In the booster circuit shown in FIG. 8, the driving nodes of odd-numbered pump circuits and those of subsequent even-numbered pump circuits are connected by two switches TSW81 and TSW82. In addition, drivers (tristate inverters) DT1 to DT5 for driving driving nodes n81 to n85 are independently arranged for the corresponding driving nodes.

The connection relationship in the booster circuit shown in FIG. 8 will be described. The anode side of a diode D1 is connected to the power supply Vcc while the cathode side is connected to a capacitor CP1 through a node N1, thereby constituting the first pump circuit. The anode side of a diode D2 is connected to the node N1 while the cathode side is connected to a capacitor CP2 through a node N2, thereby constituting the second pump circuit. In a similar manner, a plurality of pump circuits, i.e., the third, fourth, and fifth pump circuits respectively constituted by the diodes D3, D4, and D5 and the capacitors CP3, CP4, and CP5 are connected in series.

The other terminal of each of the capacitors CP1 to CP5 of the pump circuits is connected to a corresponding one of the driving nodes n81 to n85. The driving nodes n81 and n83 each connected to the other terminal of a corresponding one of the odd-numbered capacitors CP1 and CP3 counted from the first pump circuit and the driving nodes n82 and n84 each connected to the other terminal of a corresponding one of the even-numbered capacitors CP2 and CP4 counted from the first pump circuit are connected to the terminals of the switches TSW81 and TSW82, respectively. A clock φ2 is applied to the gates of the switches TSW81 and TSW82.

The driving nodes n81 to n84 connected to the first to fourth pump circuits are connected to the outputs of the drivers DT1 to DT4 in a node driving circuit 10, respectively, and driven by a clock CK1 or CK2 independently output from the drivers DT1 to DT4. The driving node n85 connected to the capacitor CP5 of the fifth pump circuit is connected to the driver DT5 in the node driving circuit 10 and driven by the clock CK1 output from the driver DT5.

The operation of the booster circuit shown in FIG. 8 will be described next with reference to the timing charts of FIGS. 6A to 6I. For the descriptive convenience, conditions such as the voltages of the circuits, the capacitances of the capacitors, and the clock timings are assumed to be the same as those in FIG. 7.

The operation at transient times T5 to T8 will be described below.

At time T6 in FIGS. 6A to 6I, when the clock CK1 is set at 4 V, the driving nodes n81 and n83 change from 2 V to 4 V, and the voltage at the driving node n85 changes from 0 V to 4 V. A voltage corresponding to this voltage difference is added to the nodes N1, N3, and N5. If the potential at the nodes N1, N3, and N5 is higher than that at the subsequent nodes, charges immediately move to the subsequent node sides. As a result, charges added to the capacitors CP1, CP3, and CP5 are distributed to the capacitors CP2, CP4, and CL, so the output voltage Voc is boosted.

When the clock CK2 is set at 0 V, the driving nodes n82 and n84 change from 2 V to 0 V, and this voltage difference of 2 V is subtracted from the voltage at the nodes N2 and N4. If the potential at the nodes N2 and N4 is lower than that at the preceding nodes, charges are immediately transferred from the preceding capacitors to boost the voltage.

Since charges stored in the capacitors CP2 and CP4, which correspond to 2 V, are removed through the drivers DT2 and DT4, respectively, the loss charge amount is C×Vcc/2×2, i.e., C×Vcc.

At time T6, when the switches TSW81 and TSW82 are closed, charges in the capacitors CP1 and CP3 move to the driving nodes n82 and n84 sides of the capacitors CP2 and CP4, respectively, to set the driving nodes n82 and n84 at 2 V. At this time, only charge movement occurs, and no charge loss, i.e., no power consumption is generated.

Accordingly, the voltage at the nodes N1 and N3 lowers by 2 V. When the voltage is lower than the power supply voltage or voltage at the preceding nodes, the nodes N1 and N3 are charged from the power supply Vcc or the preceding stages, so the voltage does not become lower than 4 V. The voltage at the nodes N2 and N4 rises and then stabilizes at a predetermined level because charges in the capacitor CP2 are distributed to the node N3 side, and charges in the capacitor CP4 are distributed to the capacitors CP5 and CL side.

At time T7, the clock CK1 is set at 0 V. Charges on the driving nodes n81 and n83 sides of the capacitors CP1 and CP3 are removed through the drivers DT1 and DT3, respectively, so the voltage at the nodes N1 and N3 lowers by 2 V. Charges on the driving node n85 side of the capacitor CP5 are removed through the driver DT5, so the voltage at the node N5 lowers by 4 V. When the voltage at the nodes N1, N3, and N5 is lower than the voltage at the preceding stages, charges are immediately transferred from the power supply Vcc or the preceding stages, so the voltage does not become lower than the Vcc level of 4 V.

When the clock CK2 is set at 4 V, the driving nodes n82 and n84 of the capacitors CP2 and CP4 are charged from 2 V to 4 V, and the voltage level at the nodes N2 and N4 rises. However, charges at the node N2 are distributed to the node N3 side, and charges at the node N4 are distributed to the nodes N5 and NL side, so the voltage stabilizes at a predetermined level.

Charges stored in the capacitors CP1 and CP3, which correspond to 2 V, are removed through the drivers DT1 and DT3, respectively. Charges stored in the capacitor CP5, which correspond to 4 V, are removed through the driver DT5. The loss charge amount is C×Vcc/2×2+C×Vcc, i.e., 2×C×Vcc (coulomb).

At time T8, the switches TSW81 and TSW82 are turned on to set the respective driving nodes at 2 V. Charges corresponding to 2 V are stored at the nodes N1 and N3. Accordingly, the voltage at these nodes increases and then stabilizes at a predetermined level because charges are distributed to the node N2 side and the nodes N4 and N5 side.

At this time, the voltage level at the nodes N2 and N4 lowers by 2 V. However, as described above, when the voltage is lower than that at the preceding stages, charges are distributed from the capacitors CP1 and CP3 to increase the voltage.

As described above, the voltage at the nodes N2 to N5 and the output voltage Vob at the node NL rise in accordance with the operation from time T5 to time T8. The reverse flow of charges at the nodes N2 to N5 and NL to the preceding pump circuit sides is inhibited by the diodes D2 to D6, respectively, and the high voltage is held. The same operation from time T5 to time T8 is repeated from time T9. By applying the clock voltage to the boosted voltage held by the operation from time T5 to time T8, a voltage six times higher than the power supply voltage Vcc can be finally obtained from the node NL.

In this arrangement as well, the same operation as that of the booster circuit shown in FIG. 7 is performed. The loss charge amount for one period due to discharge is 3×C×Vcc (coulomb). In the absence of the switches TSW81 and TSW82, the loss charge amount is 5×C×Vcc (coulomb). In this embodiment, the loss charge amount can be reduced to 60%.

Generally, letting K be the number of pump circuits, and assuming that only one pump circuit does not recycle charges, the loss charge amount for one period is given by (K+1)/2×C×Vcc (coulomb). As compared to a case wherein charges are not recycled, the loss can be reduced to (k+1)/2K.

In addition, since the output lines of the node driving circuit 10 need not be led, noise can be reduced.

Simultaneously, since excess wiring lines can be omitted, the circuit layout can be easily designed.

Furthermore, since the charge/discharge path between capacitors CP can be shortened using the two switches TSW, the high-level period of the signal φ2 can be shortened. In addition, as compared to an arrangement using one switch, a smaller-size transistor can be used.

Figure 9:
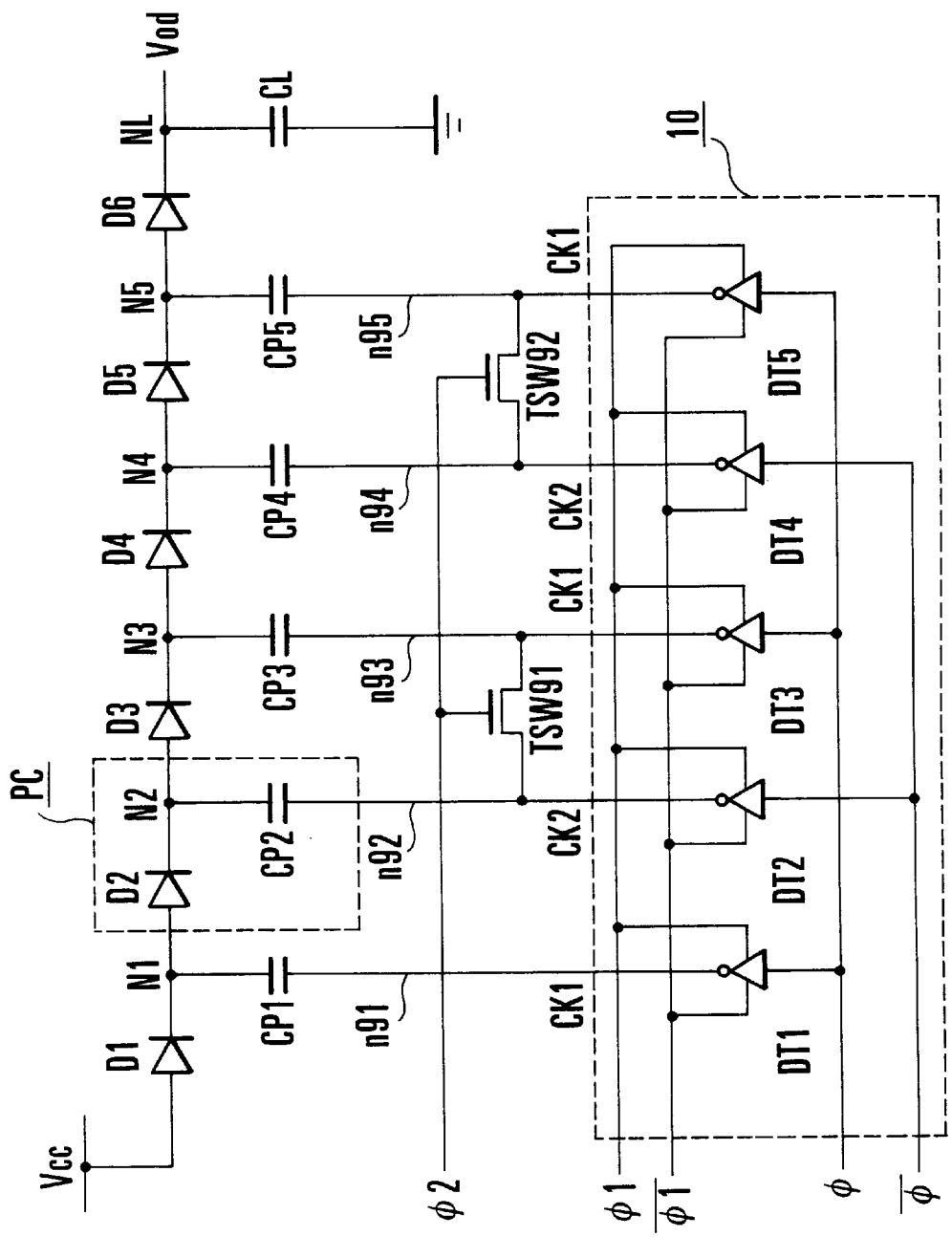
FIG. 9 is a circuit diagram showing a booster circuit according to the fourth embodiment.

FIG. 9 shows a booster circuit of the fourth embodiment.

In the booster circuit shown in FIG. 9, five (odd number) pump circuits are connected, like FIG. 8. Therefore, a voltage six times higher than a power supply voltage Vcc can be obtained as an output voltage Vod.

In this booster circuit, the driving nodes of even-numbered pump circuits and those of subsequent odd-numbered pump circuits are connected by two switches TSW91 and TSW92. In addition, drivers DT1 to DT5 for driving driving nodes n91 to n95 are independently arranged for corresponding driving nodes.

The connection relationship in the booster circuit shown in FIG. 9 will be described. The anode side of a diode D1 is connected to the power supply Vcc while the cathode side is connected to a capacitor CP1 through a node N1, thereby constituting the first pump circuit. The anode side of a diode D2 is connected to the node N1 while the cathode side is connected to a capacitor CP2 through a node N2, thereby constituting the second pump circuit. In a similar manner, a plurality of pump circuits, i.e., the third, fourth, and fifth pump circuits respectively constituted by the diodes D3, D4, and D5 and the capacitors CP3, CP4, and CP5 are connected in series.

The other terminal of each of the capacitors CP1 to CP5 of the pump circuits is connected to a corresponding one of the driving nodes n91 to n95. The driving nodes n92 and n94 each connected to the other terminal of a corresponding one of the even-numbered capacitors CP2 and CP4 counted from the first pump circuit and the driving nodes n93 and n95 each connected to the other terminal of a corresponding one of the odd-numbered capacitors CP3 and CP5 counted from the first pump circuit are connected through switches TSW91 and TSW92, respectively. A clock φ2 is applied to the gates of the switches TSW91 and TSW92.

The driving node n91 to n95 respectively connected to the first to fifth pump circuits are connected to the outputs of the drivers DT1 to DT5 in a node driving circuit 10. Each of the drivers DT1, DT3, and DT5 independently outputs a signal corresponding to a clock CK1 shown in FIG. 6H. Each of the drivers DT2 and DT4 independently outputs a signal corresponding to a clock CK2 shown in FIG. 6I.

The operation of the booster circuit shown in FIG. 9 will be described next with reference to the timing charts of FIGS. 6A to 6I. For the descriptive convenience, conditions such as the voltages of the circuits, the capacitances of the capacitors, and the clock timings are assumed to be the same as those in FIG. 7.

The operation at transient times T5 to T8 will be described below.

At time T5 in FIGS. 6A to 6I, the clock CK1 of the node driving circuit 10 is set at 4 V. A voltage of 2 V is added to nodes N3 and N5, and a voltage of 4 V is added to the node N1, so the voltage rises. When the potential at the subsequent stages is lower, charges flow to the subsequent stages, so charges added to the capacitors CP1, CP3, and CP5 are distributed to the capacitors CP2, CP4, and CL.

On the other hand, when the clock CK2 is set at 0 V, charges stored in the capacitors CP2 and CP4, which cor-respond to 2 V, are removed through the drivers DT2 and DT4, respectively. The loss charge amount at this time is C×Vcc/2×2, i.e., C×Vcc (coulomb).

According to this discharge, a voltage of 2 V is subtracted from the voltage at the nodes N2 and N4. When the potential at the preceding stages is higher, charges are distributed from the preceding stages to the capacitors CP2 and CP4.

At time T6, when the switches TSW91 and TSW92 are closed, charges in the capacitors CP3 and CP5 move to the sides of the driving nodes n92 and n94 of the capacitors CP2 and CP4, so all the driving nodes n92 to n95 are set at 2 V. At this time, only charge movement occurs, and no charge loss, i.e., no power consumption is generated.

The voltage at the nodes N2 and N4 rises by 2 V, and the voltage at the nodes N3 and N5 lowers by 2 V. When the voltage is lower than that at the preceding stages, the nodes are charged from the power supply Vcc or the preceding stages through diodes D, so the voltage does not become lower than 4 V.

At time T7, when the clock CK1 is set at 0 V, charges on the sides of the driving nodes n93 and n95 of the capacitors CP3 and CP5, which correspond to 2 V, are removed through the drivers DT3 and DT5, respectively, so the voltage at the nodes N3 and N5 lowers by 2 V. In addition, charges corresponding to 4 V are removed from the driving node n91 through the driver DT1, so the voltage at the node N1 lowers by 4 V. On the other hand, when the clock CK2 is set at 4 V, the driving nodes of the capacitors CP2 and CP4 are charged from 2 V to 4 V, so the voltage level at the nodes N2 and N4 rises. When the voltage at the nodes is lower than the voltage at the preceding stages, charges are distributed from the preceding stages to the subsequent stages, so the voltage stabilizes at a predetermined level. Therefore, the output voltage Vod is also set at the predetermined level and maintains this level by the load capacitor CL.

The loss charge amount at this time is 2×C×Vcc (coulomb).

At time T8, when the switches TSW91 and TSW92 are turned on, all the driving nodes are set at 2 V. Charges corresponding to 2 V are stored at the nodes N3 and N5. The voltage increases and then stabilizes at a predetermined level because the charges are distributed to the node N4 side and the node NL side. No charges are lost at this time.

As described above, the voltage at the nodes N1 to N5 and the output voltage Vod at the node NL rise in accordance with the operation from time T5 to time T8. The reverse flow of charges at the nodes N1 to N5 and NL to the pump circuit sides at the preceding stages is inhibited by the diodes D1 to D6, respectively, and the high voltage is held. The same operation from time T5 to time T8 is repeated from time T9. By applying the clock voltage to the boosted voltage held by the operation from time T5 to time T8, a voltage six times higher than the power supply voltage Vcc can be finally obtained from the node NL.

In the booster circuit shown in FIG. 9, the loss charge amount can be reduced to 60%, and since excess wiring lines can be omitted, the circuit layout can be easily designed, like the circuit shown in FIG. 8.

Furthermore, since the charge/discharge path between capacitors CP can be shortened using the two transistors TSW, the high-level period of the signal φ2 can be shortened. In addition, as compared to an arrangement using one switch, a smaller-size transistor can be used.

Figure 10:
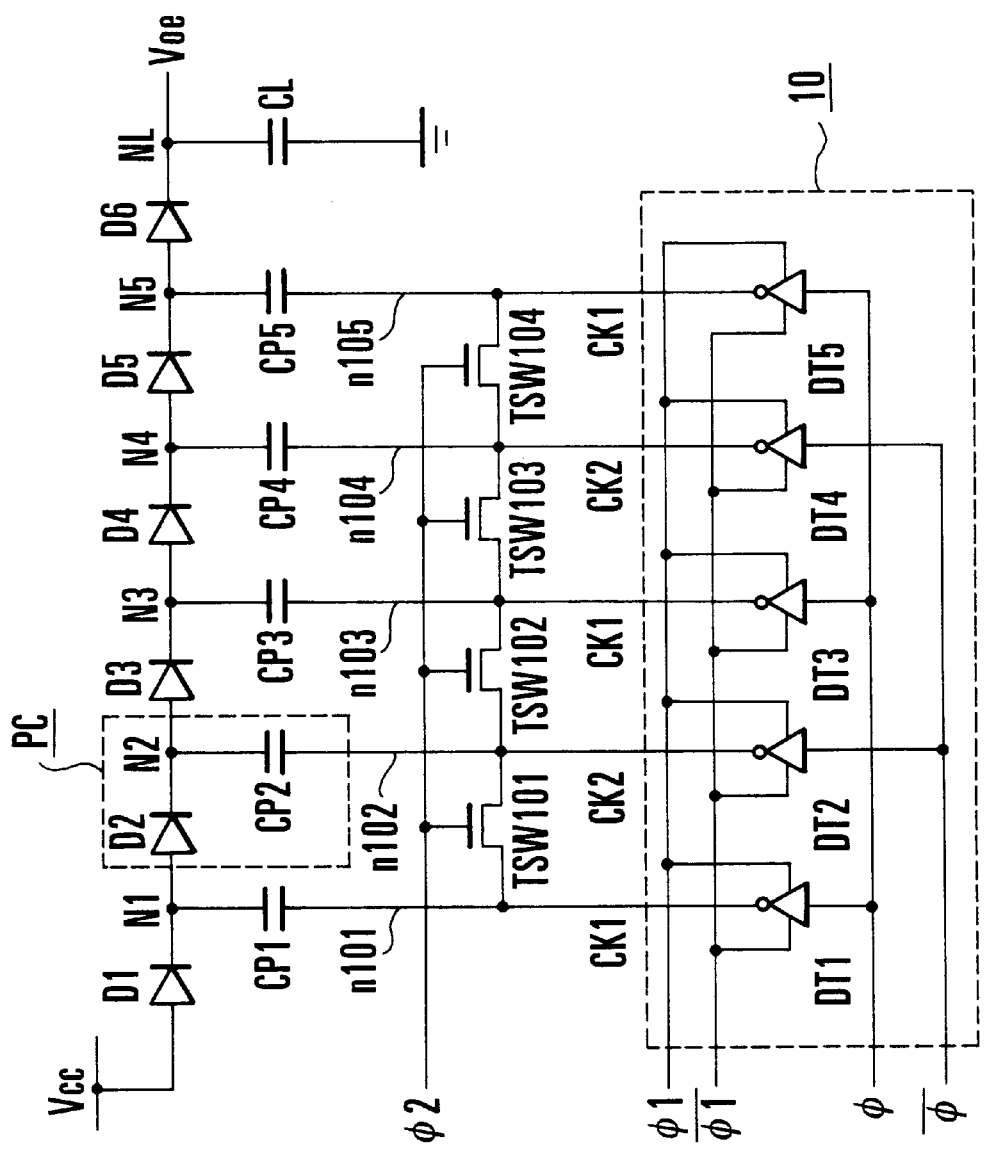
FIG. 10 is a circuit diagram showing a booster circuit according to the fifth embodiment.

FIG. 10 shows a booster circuit of the fifth embodiment.

In the booster circuit shown in FIG. 10, five (odd number) pump circuits are connected, as in FIG. 9. Therefore, a voltage six times higher than a power supply voltage Vcc can be obtained as an output voltage Voe. In this booster circuit, the driving nodes of pump circuits are connected by four switches TSW101 and TSW104. In addition, drivers DT1 to DT5 for driving the driving nodes are independently arranged for corresponding driving nodes.

The connection relationship in the booster circuit shown in FIG. 10 will be described. The anode side of a diode D1 is connected to the power supply Vcc while the cathode side is connected to a capacitor CP1 through a node N1, thereby constituting the first pump circuit. The anode side of a diode D2 is connected to the node N1 while the cathode side is connected to a capacitor CP2 through a node N2, thereby constituting the second pump circuit. In a similar manner, a plurality of pump circuits, i.e., the third, fourth, and fifth pump circuits respectively constituted by the diodes D3, D4, and D5 and the capacitors CP3, CP4, and CP5 are connected in series.

The other terminal of each of the capacitors CP1 to CP5 of the pump circuits is connected to a corresponding one of the driving nodes n101 to n105. The driving nodes n101 to n105 are connected through switches TSW101 to TSW104. A clock φ2 is commonly applied to the gates of the switches TSW101 to TSW104. Each of the drivers DT1, DT3, and DT5 independently outputs a signal corresponding to a clock CK1 shown in FIG. 6H, and each of the drivers DT2 and DT4 independently outputs a signal corresponding to a clock CK2 shown in FIG. 6I to drive the driving nodes n101 to n105, respectively.

The operation of the booster circuit shown in FIG. 10 will be described next with reference to the timing charts of FIGS. 6A to 6I. For the descriptive convenience, conditions such as the voltages of the circuits, the capacitances of the capacitors, and the clock timings are assumed to be the same as those in FIG. 7.

The operation at transient times T5 to T8 will be described below.

At time T5 in FIGS. 6A to 6I, when the clock CK1 of the node driving circuit 10 is set at 4 V, the voltage at the driving nodes n101, n103, and n105 rises from 1.6 V to 4 V. On the other hand, when the clock CK2 is set at 0 V, the voltage at the nodes n102 and n104 lowers from 1.6 V to 0 V. Accordingly, the voltage at the nodes N1, N3, and N5 rises by 2.4 V, and the voltages at the nodes N2 and N4 lowers by 1.6 V. If the voltage is lower than the voltage at the preceding stages, charges are immediately supplied from the power supply Vcc or the nodes at the preceding stages, so the voltage stabilizes at a predetermined level.

Charges stored in the capacitors CP2 and CP4, which correspond to 1.6 V, i.e., $2/5 \times Vcc$ are removed through the drivers DT2 and DT4. The loss charge amount is $C \times (2/5 \times Vcc) \times 2$, i.e., $4/5 \times C \times V$ (coulomb).

At time T6, when the switches TSW101 to TSW104 are closed, charges on the sides of the driving nodes n101, n103, and n105 of the capacitors CP1, CP3, and CP5 move to the sides of the driving nodes n102 and n104 of the capacitors CP2 and CP4 through the switches TSW101 to TSW104, so all the driving nodes n101 to n105 are set at 2.4 V, i.e., $3/5 \times Vcc$. At this time, only charge movement occurs, and no charge loss, i.e., no power consumption is generated.

Accordingly, the voltage at the nodes N1, N3, and N5 lowers by 2.4 V, and the voltage at the nodes N2 and N4 rises by 2.4 V. Charges are transferred from the preceding stage to the subsequent stages in a similar manner, so the voltage stabilizes at a predetermined level.

At time T7, when the clock CK1 is set at 0 V, charges on the driving node sides of the capacitors CP1, CP3, and CP5, which correspond to 2.4 V, i.e., $3/5 \times Vcc$ are removed through the drivers DT1, DT3, and DT5, so the voltage at the nodes N1, N3, and N5 lowers by 2.4 V. On the other hand, when the clock CK2 is set at 4 V, the driving nodes n102 and n104 of the capacitors CP2 and CP4 are charged from 2.4 V to 4 V, so the voltage level at the node N2 and N4 rises by 1.6 V. In this case as well, charge transfer occurs, and the voltage stabilizes at a predetermined level. Therefore, the output voltage Voe also increases and maintains its level by a load capacitor CL.

The loss charge amount due to discharge is $C \times (3/5 \times Vcc) \times 3$, i.e., $9/5 \times C \times Vcc$ (coulomb).

At time T8, when the switches TSW101 to TSW104 are turned on, charges stored in three capacitors, which correspond to 4 V, are distributed to five capacitors. All the driving nodes are set at 1.6 V, i.e., $4/5 \times Vcc$. The voltage at the nodes N1, N3, and N5 increases by 1.6 V, and the voltage at the nodes N2 and N4 lowers by 2.4 V. However, since charges are distributed, the voltage stabilizes at a predetermined level.

As described above, the voltage at the nodes N2 to N5 and the output voltage Vod at a node NL rise in accordance with the operation from time T5 to time T8. The reverse flow of charges at the nodes N2 to N5 and NL to the preceding pump circuit sides is inhibited by the diodes D2 to D6, respectively, and the high voltage is held. The same operation from time T5 to time T8 is repeated from time T9. By applying the clock voltage to the boosted voltage held by the operation from time T5 to time T8, a voltage six times higher than the power supply voltage Vcc can be finally obtained from the node NL.

In the booster circuit shown in FIG. 10, the loss charge amount for one period is $(4/5 + 9/5) \times C \times Vcc$, i.e., $13/5 \times C \times Vcc$ (coulomb). In the absence of the switches TSW101 to TSW104, the loss charge amount is $5 \times C \times Vcc$ (coulomb). In this embodiment, the loss charge amount can be reduced to 52%.

Generally, when an odd number L of pump circuits are used, and charges in each pump circuit are commonly recycled, the loss charge amount for one period is given by $(L^2+1)/2L \times C \times Vcc$ (coulomb). As compared to a case wherein charges are not recycled, the loss can be reduced to $(L^2+1)/2L^2$.

In this embodiment, even when an odd number of pump circuits are used, charges of each stage can be recycled by arranging switches between the driving nodes, so the increase in power consumption of the circuit can be further suppressed. In addition, since the length of the interconnection for connecting the driving nodes and the switches is minimized, noise can be prevented, and the circuit layout can be easily designed.

Figure 11:
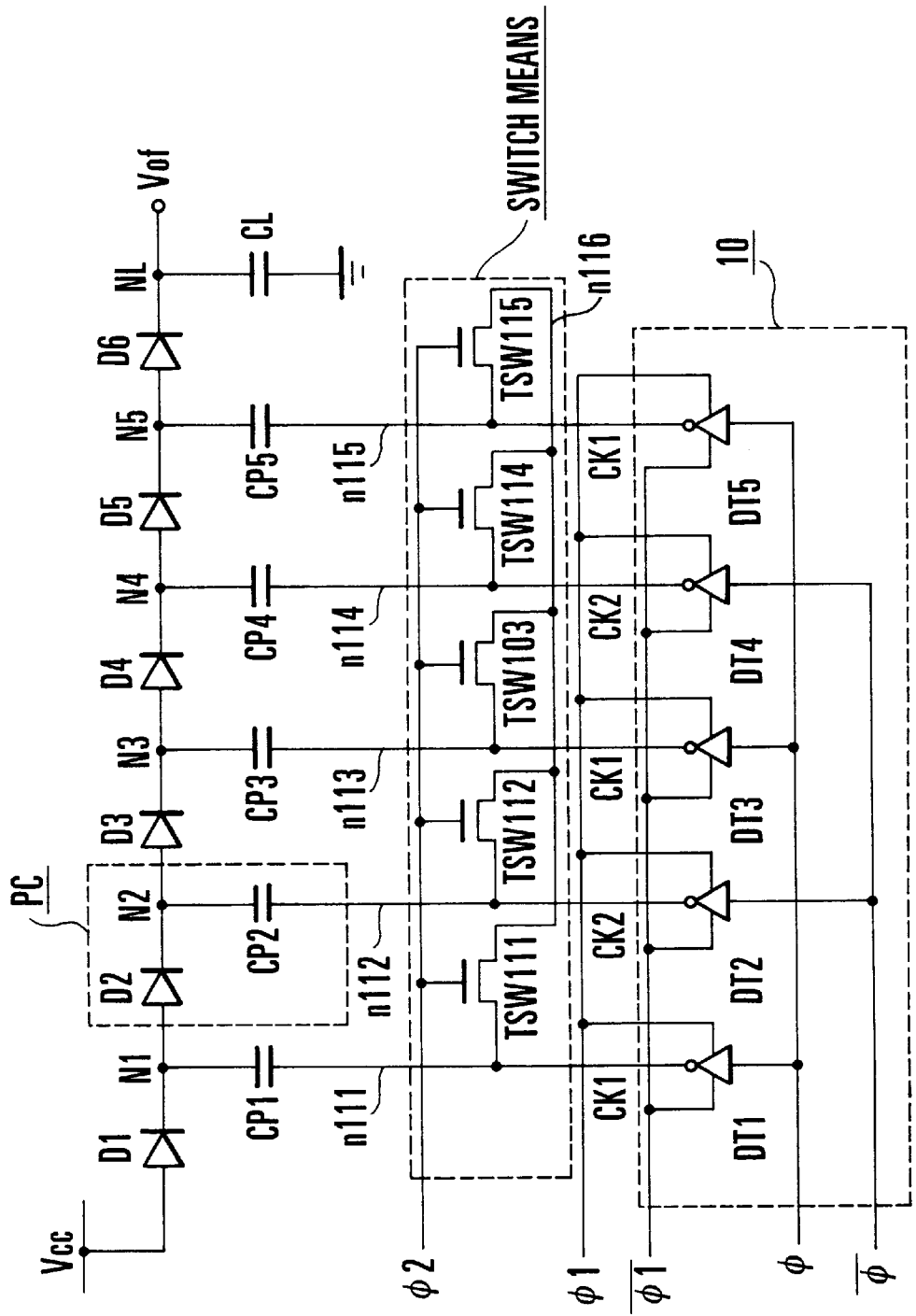
FIG. 11 is a circuit diagram showing a booster circuit according to the sixth embodiment.

FIG. 11 shows a booster circuit of the sixth embodiment.

In the booster circuit shown in FIG. 11, five (odd number) pump circuits are connected, as in FIG. 9. One terminal of each of switches TSW is connected to a corresponding one of the driving nodes of the pump circuits, and the other terminal of each of the switches is commonly connected.

The connection relationship in the booster circuit shown in FIG. 11 will be described. The anode side of a diode D1 is connected to a power supply Vcc while the cathode side is connected to a capacitor CP1 through a node N1, thereby constituting the first pump circuit. The anode side of a diode D2 is connected to the node N1 while the cathode side is connected to a capacitor CP2 through a node N2, thereby constituting the second pump circuit. In a similar manner, a plurality of pump circuits, i.e., the third, fourth, and fifth pump circuits respectively constituted by the diodes D3, D4, and D5 and the capacitors CP3, CP4, and CP5 are connected in series.

The other terminal of each of the capacitors CP1 to CP5 of the pump circuits is connected to a corresponding one of driving nodes n111 to n115. One terminal of each of switches TSW111 to TSW115 is connected to a corresponding one of the driving nodes n111 to n115, and the other terminal of each of the switches TSW111 to TSW115 is commonly connected. A clock $\phi 2$ is commonly applied to the gates of the switches TSW111 to TSW115.

Each of the driving nodes n111 to n115 is connected to the output of a corresponding one of drivers DT1 to DT5 in a node driving circuit 10. each of the drivers DT1, DT3, and DT5 outputs a signal corresponding to a clock CK1 shown in FIG. 6H to drive the driving nodes n111, n113, and n115. Each of the drivers DT2 and DT4 outputs a signal corresponding to a clock CK2 shown in FIG. 6I to drive the driving nodes n112 and n114.

The operation of the booster circuit shown in FIG. 11 will be described next with reference to the timing charts of FIGS. 6A to 6T. For the descriptive convenience, conditions such as the voltages of the circuits, the capacitances of the capacitors, and the clock timings are assumed to be the same as those in FIG. 7. The operation at transient times T5 to T8 will be described below.

At time T5, when the clock CK1 of the node driving circuit 10 is set at 4 V, the voltage at the driving nodes n111, n113, and n115 changes from 1.6 V to 4 V. Since a voltage of 2.4 Vis added to the nodes N1, N3, and N5, the voltage rises. On the other hand, when the clock CK2 is set at 0 V, the voltage at the nodes n112 and n114 changes from 1.6 V to 0 V, so the voltage at the nodes N2 and N4 lowers by 1.6 V. When the voltage at the nodes is lower than that at the preceding stages, charges immediately move from the power supply Vcc or the capacitors at the preceding stages. The voltage converges to a predetermined level.

Charges stored on the sides of the driving nodes n112 and n114 of the capacitors CP2 and CP4, which correspond to 1.6 V, i.e, $\frac{2}{5} \times Vcc$ are removed through the drivers DT2 and DT4. The loss charge amount is $C \times (\frac{2}{5} \times Vcc) \times 2$, i.e., $\frac{4}{5} \times C \times Vcc$ (coulomb).

At time T6, when the switches TSW111 to TSW115 are closed, charges in the capacitors CP1, CP3, and CP5 move to the sides of the driving nodes n112 and n114 of the capacitors CP2 and CP4 through the switches TSW111 to TSW115, so all the driving nodes n111 to n115 are set at 2.4 V. At this time, only charge movement occurs, and no charge loss, i.e., no power consumption is generated.

The voltage at the nodes N1, N3, and N5 lowers by 1.6 V, and the voltage at the nodes N2 and N4 rises by 2.4 V. When the voltage at the subsequent stages is lower, charges move, and the voltage converges to a predetermined level.

At time T7, when the clock CK1 is set at 0 V, charges on the driving node sides of the capacitors CP1, CP3, and CP5, which correspond to 2.4 V, are removed through the drivers DT1, DT3, and DT5, so the voltage at the nodes N1, N3, and N5 lowers by 2.4 V. On the other hand, when the clock CK2 is set at 4 V, the driving nodes of the capacitors CP2 and CP4 are charged from 2.4 V to 4 V, so the voltage level at the nodes N2 and N4 rises by 1.6 V. After this, when the voltage at the subsequent stages is lower, charges move, and the voltage converges to a predetermined level. Therefore, an output voltage Vof also increases and maintains this level by a load capacitor CL.

The loss charge amount due to discharge is $C \times (\frac{3}{5} \times Vcc) \times 3$, i.e., $\frac{9}{5} \times C \times Vcc$ (coulomb).

At time T8, when the switches TSW111 to TSW115 are turned on, charges stored on the sides of the driving nodes n112 and n114 of the capacitors CP2 and CP4, which correspond to 4 V, are distributed to the capacitors CP1 to CP5, so all the driving nodes n111 to n115 are set at 1.6 V. Charges corresponding to 1.6 V are stored at the nodes N1, N3, and N5 to increase the voltage. The voltage at the nodes N2 and N4 lowers by 2.4 V. However, when the voltage at the subsequent stages is lower, charges are distributed, and the voltage stabilizes at a predetermined level.

As described above, the output voltage Vof rises in accordance with the operation from time T5 to time T8, and the boosted voltage is held by the load capacitor CL. The same operation from time T5 to time T8 is repeated from time T9. By applying the clock voltage to the boosted voltage already held at the nodes N2 to N4 and NL by the operation from time T5 to time T8, a voltage six times higher than the power supply voltage Vcc can be finally obtained.

In the booster circuit shown in FIG. 11, the loss charge amount for one period is $(\frac{4}{5}+\frac{9}{5}) \times C \times Vcc$, i.e., $\frac{13}{5} \times C \times Vcc$ (coulomb), as in the booster circuit shown in FIG. 10. In the absence of the switches TSW111 to TSW115, the loss charge amount is $5 \times C \times Vcc$ (coulomb). In this embodiment, the loss charge amount can be reduced to 52%.

Each of the drivers DT1 to DT5 of the circuit shown in FIG. 11 also has a function of temporarily setting the output terminal in a floating state when the output level is to be switched. When the output terminal is set in the floating state, the switches TSW111 to TSW115 are turned on to short-circuit the output terminals of the drivers DT1 to DT5. Since charges removed from the capacitors CP can be recycled as charges to be stored, the power consumption can be decreased, and charge transfer between the capacitors CP can be more quickly performed than in the circuit of the fifth embodiment shown in FIG. 10. In addition, since the amount of charges flowing to one switch TSW (transistor) becomes small, the transistor size can be decreased. Furthermore, since the switches TSW can be arranged independently of the arrangement of the pump circuits, the degree of freedom in designing the mask layout increases, and this arrangement can be effectively applied to an odd number of pump circuits.

FIG. 12 shows a booster circuit of the seventh embodiment. FIGS. 13A to 13D show the operation timings of various portions of the circuit.

In the booster circuit shown in FIG. 12, four (even number) pump circuits are connected. One of driving nodes is charged with a power supply voltage, and these charges are used to drive the other driving node.

The connection relationship in the booster circuit shown in FIG. 12 will be described. The anode side of a diode D1 is connected to a power supply Vcc while the cathode side is connected to a capacitor CP1 through a node N1, thereby constituting the first pump circuit. The anode side of a diode D2 is connected to the node N1 while the cathode side is connected to a capacitor CP2 through a node N2, thereby constituting the second pump circuit. In a similar manner, a plurality of pump circuits, i.e., the third and fourth pump circuits respectively constituted by the diodes D3 and D4 and the capacitors CP3 and CP4 are connected in series.

The other terminal of each of the capacitors CP1 and CP3 at the odd-numbered stages counted from the first pump circuit is connected to a driving node n121. The other terminal of each of the capacitors CP2 and CP4 at the even-numbered stages counted from the first pump circuit is connected to a driving node n122.

The two terminals of a switch TSW121 are connected to the driving nodes n121 and n122. A clock φ122 is applied to the control terminal of the switch TSW121. A node driving circuit 10 is constituted by a PMOS transistor MOS31 and an NMOS transistor MOS32. The source of the transistor MOS31 is connected to the power supply Vcc, the drain is connected to the driving node n121, and the gate is connected to a control signal φ121. The drain of the transistor MOS32 is connected to the driving node n122, the source is connected to ground GND, and the gate is connected to a control signal φ121.

The operation of the booster circuit shown in FIG. 12 will be described next with reference to the timing charts of FIGS. 13A to 13D.

For the descriptive convenience, conditions such as the voltages of the circuits and the capacitances of the capacitors are assumed to be the same as those in FIG. 7.

In FIGS. 13A to 13D, the control signals φ121 and $\overline{\varphi121}$ have the same frequency and opposite phases. The control signal φ122 has the same frequency as that of the control signal φ121 and goes high when the control signal φ121 is at low level and the control signal $\overline{\varphi121}$ is at high level.

Figure 13:
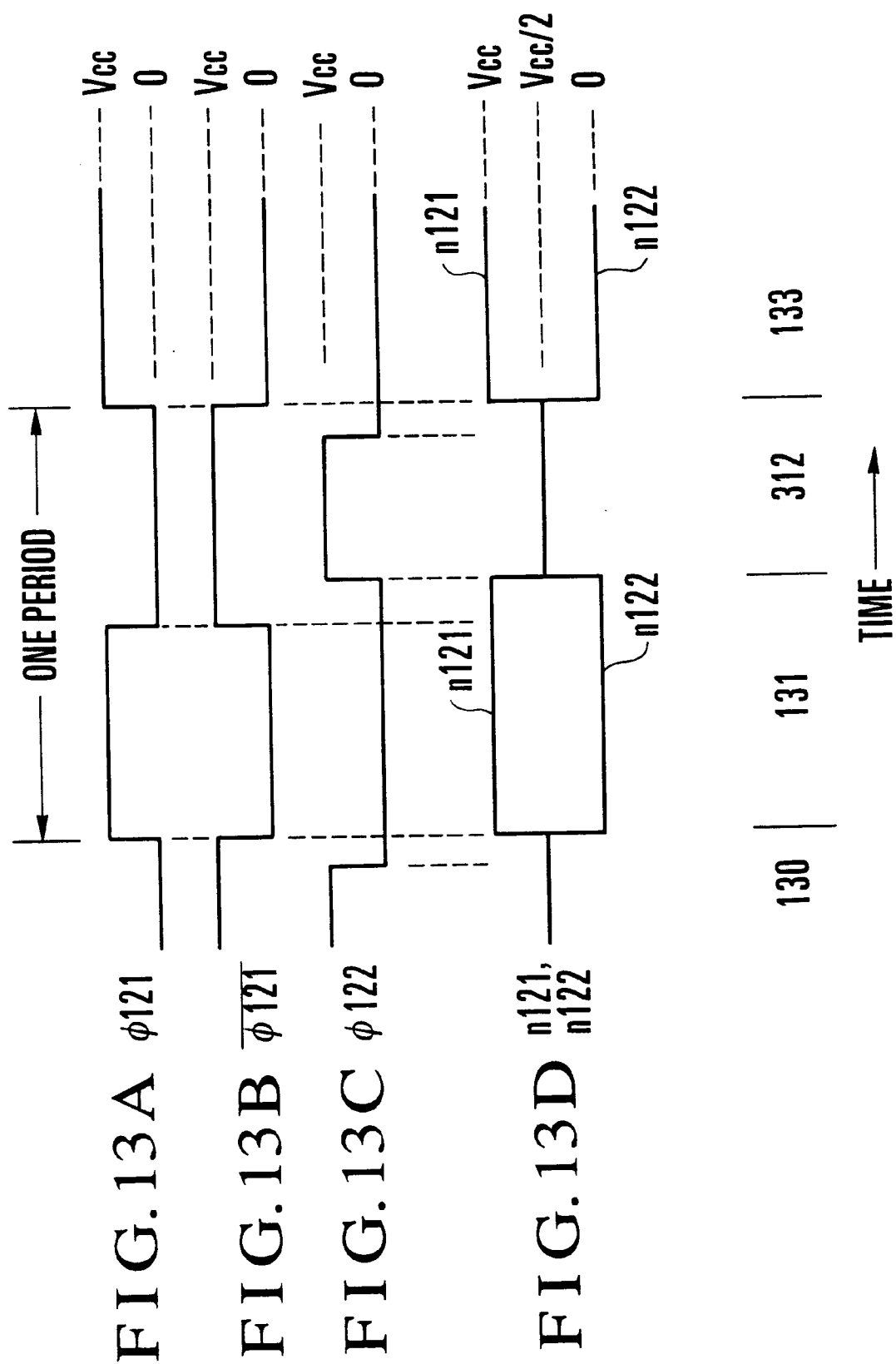
FIGS. 13A to 13D are timing charts showing the operations of various portions of the circuit shown in FIG. 12.

At time T130 in FIGS. 13A to 13D, the control signals φ121 and $\overline{\varphi121}$ are at low and high levels, respectively (FIGS. 13A and 13B). Therefore, both the transistors MOS31 and MOS32 are turned off, and the driving nodes n121 and n122 are set at an intermediate potential of 2 V. When the control signal φ122 goes low (FIG. 13C), the switch TSW121 is turned off.

At time T131, the control signals φ121 and $\overline{\varphi121}$ go high and low, respectively (FIGS. 13A and 13B). Both the transistors MOS31 and MOS32 are turned on, the driving node n121 is set at 4 V, and the driving node n122 is set at 0 V. A voltage of 2 V is added to the nodes N1 and N3, and a voltage of 2 V is subtracted from the nodes N2 and N4. When the voltage at the subsequent stages is lower, charges at the nodes N1 to N4 immediately move to the subsequent node sides to increase an output voltage Vog. This voltage is held by a load capacitor CL.

In this state, even when the control signals φ121 and $\overline{\varphi121}$ are set at low and high levels, respectively, to turn off the drivers, the voltage level at the driving nodes n121 and n122 is maintained. At this time, charges of C×Vcc (coulomb) are lost, as will be described later.

At time T132, when the control signal p122 goes high, the switch TSW121 is closed. Charges on the driving node n121 side of the capacitors CP1 and CP3 move to the driving node n122 side through the switch TSW121, so both the driving nodes n121 and n122 are set at 2 V. At this time, only charge movement occurs, and no charge loss, i.e., no power consumption is generated.

Since charges corresponding to 2 V are removed, the voltage at the nodes N1 and N3 lowers, and the voltage at the nodes N2 and N4 rises by 2 V. When the voltage at the subsequent stages is lower, each node is charged from the power supply Vcc or the preceding stage through the diode, so the voltage stabilizes at a voltage equal to or higher than the Vcc level of 4 V. Therefore, the output voltage Vog also increases and maintains this voltage by the load capacitor CL.

Even when the control signal φ122 is set at low level to turn off the switch TSW121, the voltage level at the driving nodes n121 and n122 is held.

At time T133 of the next period, when the control signals φ1 and $\overline{\varphi1}$ are set at high and low levels, respectively, to turn on the transistors, the driving nodes n121 is set at 4 V, and the driving node n122 is set at 0 V. Charges stored in the capacitors CP2 and CP4, which correspond to 2 V, are removed through the transistor MOS32. The loss charge amount is C×Vcc/2×2, i.e., C×Vcc (coulomb). In this embodiment, discharge is performed once in a period. Therefore, the loss charge amount for one period is also C×Vcc (coulomb).

Let J be the number of pump circuits, and when one driving node is charged to the power supply voltage to boost the voltage, and then these charges are moved to the other driving node and recycled, the loss charge amount for one period is given by (J/2)×C×Vcc/2, i.e., J×C×Vcc/4 (coulomb). Since the boosted voltage is given by (J+1)×Vcc/2, the loss charge amount per unit boost ratio is given by {J/2(J+1)}×C ×Vcc (coulomb).

In this embodiment, an output voltage 2.5 times higher than the power supply voltage can be obtained with a simple node driving circuit constituted by two transistors. In addition, the loss charge amount per unit boost ratio can be halved as compared to prior art 1.

Figure 14:
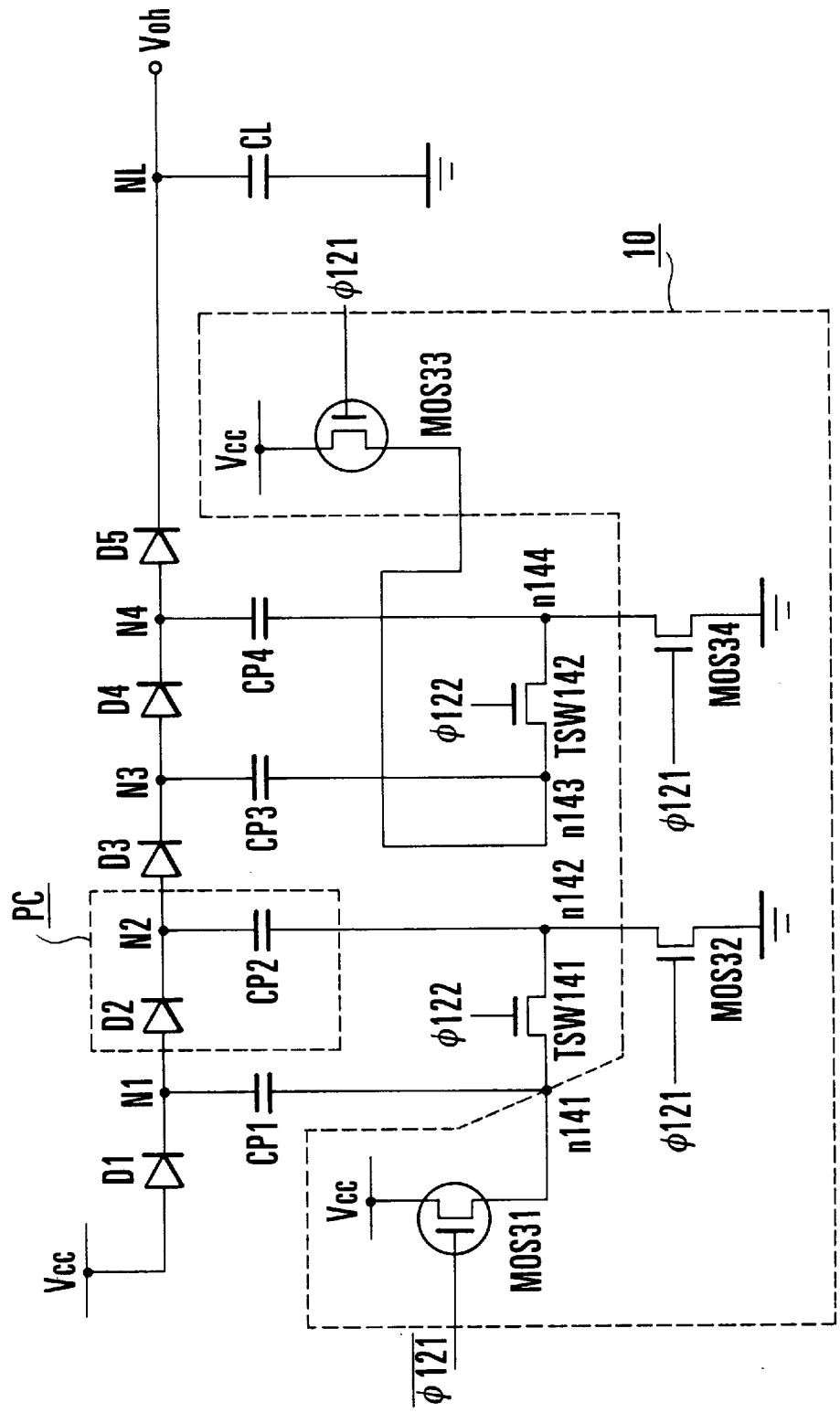
FIG. 14 is a circuit diagram showing a booster circuit according to the eighth embodiment.

FIG. 14 shows a booster circuit of the eighth embodiment.

The circuit shown in FIG. 14 is a modification of the booster circuit shown in FIG. 12. Four (even number) pump circuits are connected, two sets of node driving circuits shown in FIG. 12 are arranged, and switches are inserted between driving nodes.

The connection relationship in the booster circuit shown in FIG. 14 will be described. The anode side of a diode D1 is connected to a power supply Vcc while the cathode side is connected to a capacitor CP1 through a node N1, thereby constituting the first pump circuit. The anode side of a diode D2 is connected to the node N1 while the cathode side is connected to a capacitor CP2 through a node N2, thereby constituting the second pump circuit. In a similar manner, a plurality of pump circuits, i.e., the third and fourth pump circuits respectively constituted by the diodes D3 and D4 and the capacitors CP3 and CP4 are connected in series.

The other terminal of each of the capacitors CP1 to CP4 is connected to a corresponding one of driving nodes n141 to n144. The drains of PMOS transistors MOS31 and MOS33 are connected to the driving nodes n141 and n143, respectively, the sources are connected to the power supply Vcc, and the gates are connected to a control signal $\overline{\varphi121}$ shown in FIG. 13B. The drains of NMOS transistors MOS32 and MOS34 are connected to the driving nodes n142 and n144, respectively, the sources are connected to ground GND, and the gates are connected to a control signal φ121 shown in FIG. 13A. The driving nodes n141 and n142 are connected by a switch TSW141, and the driving nodes n143 and n144 are connected by a switch TSW142.

When the switches and drivers are controlled by control signals generated at timings shown in FIGS. 13A to 13C, the potential at each driving node can be changed, as shown in FIG. 13D. The driving nodes n141 and n143 correspond to the driving node n121, and the driving nodes n142 and n144 correspond to the driving node n122.

The operation of the booster circuit shown in FIG. 14 will be described next with reference to the timing charts of FIGS. 13A to 13D.

For the descriptive convenience, conditions such as the voltages of the circuits and the capacitances of the capacitors are assumed to be the same as those in FIGS. 7 and 13A to 13D.

At time T130 in FIGS. 13A to 13D, since the control signals φ121 and $\overline{\varphi121}$ are at low and high levels, respectively (FIGS. 13A and 13B), the drivers are turned off, and the driving nodes n141 to n144 are set at an intermediate potential of 2 V. When the control signal φ122 goes low (FIG. 13C), the switches TSW141 and TSW142 are turned off.

At time T131, when the control signals φ121 and $\overline{\phi 121}$ go high and low, respectively (FIGS. 13A and 13B), the transistors MOS31 to MOS34 are turned on. The driving nodes n141 and n143 are set at 4 V, and the driving nodes n142 and n144 are set at 0 V. A voltage of 2 V is added to the nodes N1 and N3, so the voltage level at the nodes N1 and N3 lowers by 2 V. When the voltage at the nodes of the preceding stages is higher, charges immediately move to the subsequent stages to boost an output voltage Voh, and this voltage is held by a load capacitor CL.

In this state, even when the control signals φ121 and $\overline{\phi 121}$ are set at low and high levels, respectively, to turn off the transistors and set the driving nodes in a floating state, this voltage level is maintained.

The loss charge amount at this time is the same as that in FIG. 12, i.e., C×Vcc (coulomb).

At time T132, when the control signal φ122 goes high to close the switches TSW141 and TSW142, charges in the capacitors CP1 and CP3 move to the sides of the driving nodes n142 and n144 through the switches TSW141 and TSW142, so the driving nodes are set at 2 V. At this time, only charge movement occurs, and no charge loss, i.e., no power consumption is generated.

Since charges corresponding to 2 V are removed, the voltage at the nodes N1 and N3 lowers, and the voltage at the nodes N2 and N4 increases by 2 V. When the voltage at the nodes of the preceding stages is higher, charges immediately move to the subsequent stages to boost the output voltage Voh, and this voltage is held by the load capacitor CL.

Even when the control signal φ122 is set at low level to turn off the switches TSW141 and TSW142, the voltage levels at the driving nodes is maintained.

From time T133 of the next period, the operation from time T131 to time T132 is repeated, and finally, a voltage 2.5 times higher than the power supply voltage Vcc is obtained as the output voltage Voh.

In this embodiment, when the transistors MOS32 and MOS34 are turned on, the driving nodes n142 and n144 are set at 0 V. Charges stored in the capacitors CP2 and CP4, which correspond to 2 V, are removed through the transistors MOS32 and MOS34, respectively. For this reason, the loss charge amount is C×Vcc/2×2, i.e., C×Vcc (coulomb). In this embodiment, since discharge is performed once in a period, the loss charge amount for one period is also C×Vcc (coulomb).

As described above, like the circuit shown in FIG. 12, a high output voltage can be obtained while maintaining a low power consumption. In addition, since two switches are used, the switches can be arranged close to the capacitors, and the length of the interconnection for connecting them can be minimized. Therefore, noise can be suppressed, and the area required for interconnection can be reduced.

Figure 15:
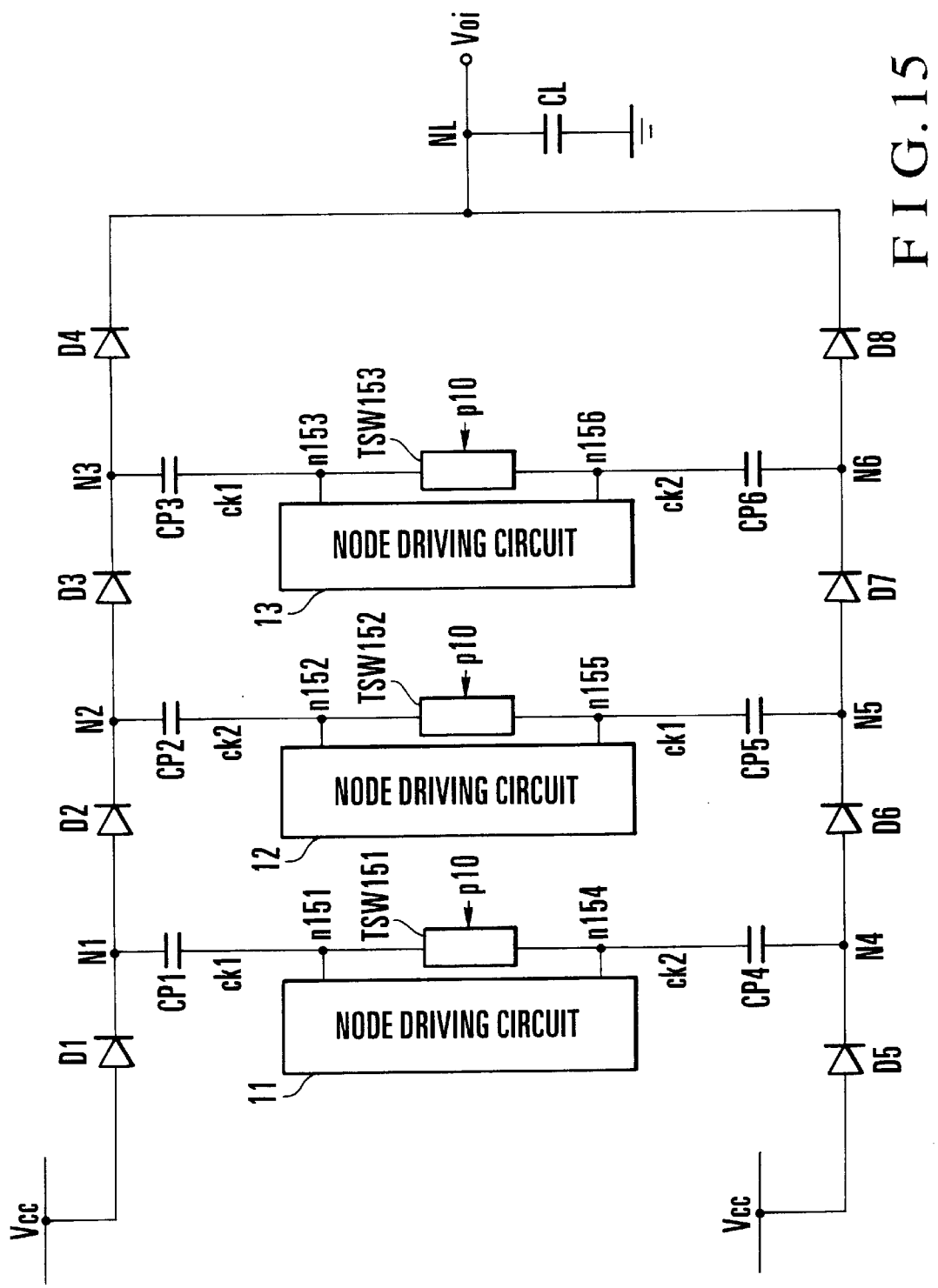
FIG. 15 is a block diagram showing a booster circuit according to the ninth embodiment.
Figure 18:
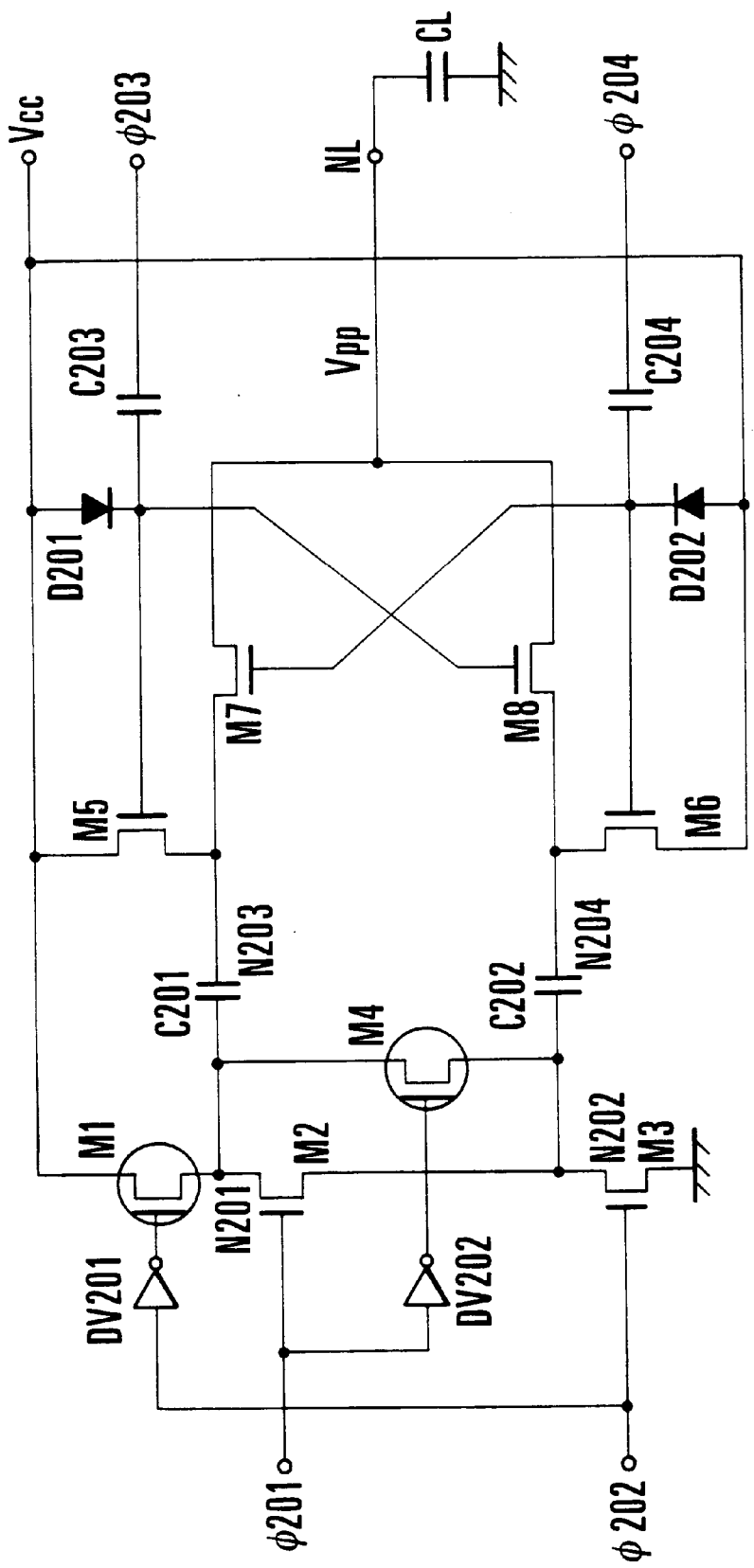
FIG. 18 is a circuit diagram showing another conventional booster circuit.

FIG. 15 shows a booster circuit of the ninth embodiment. Two structures each having three pump circuits connected in series are connected in parallel. Capacitors CP1, CP2, and CP3 recycle charges together with capacitors CP4, CP5, and CP6, respectively. Each of node driving circuits 11 to 13 outputs signals corresponding to clocks CK1 and CK2 shown in FIGS. 4F and 4G or FIGS. 6H and 6I, as in the first embodiment.

The connection relationship in the booster circuit shown in FIG. 15 will be described. The anode side of a diode D1 is connected to a power supply Vcc while the cathode side is connected to the capacitor CP1 through a node N1, thereby constituting the first pump circuit. The anode side of a diode D2 is connected to the node N1 while the cathode side is connected to the capacitor CP2 through a node N2, thereby constituting the second pump circuit. In a similar manner, the third pump circuit constituted by a diode D3 and the capacitor CP3 is connected in series.

On the other hand, the anode side of a diode D5 is connected to the power supply Vcc while the cathode side is connected to the capacitor CP1 through a node N4, thereby constituting the fourth pump circuit. The anode side of a diode D6 is connected to the node N4 while the cathode side is connected to the capacitor CP5 through a node N5, thereby constituting the fifth pump circuit. In a similar manner, the sixth pump circuit constituted by a diode D7 and the capacitor CP6 is connected in series.

The other terminal of each of the capacitors CP1 to CP3 of the first to third pump circuits is connected to a corresponding one of driving nodes n151 to n153. The other terminal of each of the capacitors CP4 to CP6 of the fourth to sixth pump circuits is connected to a corresponding one of driving nodes n154 to n155. Each of the node driving circuits 11 to 13 is constituted by a circuit shown in FIG. 3 or 5 and has terminals for outputting the two signals CK1 and CK2. One output terminal of each of the node driving circuits 11 to 13 is connected to a corresponding one of the driving nodes n151, n155, and n153 to output a signal corresponding to the clock CK1. The other output terminal of each of the node driving circuits 11 to 13 is connected to a corresponding one of the driving nodes n154, n152, and n156 to output a signal corresponding to the clock CK2. The driving nodes n151 and n154 are connected by a switch TSW151. The driving nodes n152 and n155 are connected by a switch TSW152. The driving nodes n153 and n156 are connected by a switch TSW153.

The clocks CK1 and CK2 in opposite phases are supplied to the driving nodes of the same stages of the parallelly connected pump circuits, e.g., the driving nodes n151 and n154 of the same stage.

The operation of the circuit shown in FIG. 15 will be described next with reference to FIG. 2.

The operation at transient times T5 to T8 will be described below.

At time T5, when the clock CK1 rises to 4 V, a voltage of 2 V is added to the nodes N1, N5, and N3 to boost the voltage. When the clock CK2 falls to 0 V, a voltage of 2 V is subtracted from the nodes N4, N2, and N6 to lower the voltage. If the voltage at the subsequent stages is lower, charges immediately flow to the nodes at the next stages through the diodes to boost the output voltage. The reverse flow of this boosted voltage is inhibited by the diodes D4 and D8, so an output voltage Voi is held by a load capacitor CL.

Charges stored on the sides of the driving nodes n154, n152, and n156 of the capacitors CP4, CP2, and CP6 are removed through the node driving circuits 11 to 13. Therefore, the loss charge amount is C×Vcc/2×3, i.e., 3/2× C×Vcc (coulomb).

At time T6, when a control signal P0 goes high to close the switches TSW151 to TSW153, charges in the capacitors CP1, CP5, and CP3 move to the sides of the capacitors CP4, CP2, and CP6 through the switches TSW151 to TSW153, respectively. At this time, only charge movement occurs, and no charge loss, i.e., no power consumption is generated.

Accordingly, the voltage at the nodes N1, N5, and N3 lowers by 2 V, and the voltage at the nodes N4, N2, and N6 increases by 2 V. When the voltage at the subsequent stages is lower, charges immediately move to the nodes of the next stages through the diodes, so the voltage converges to a predetermined value.

At time T7, when the clock CK1 is set at 0 V, and the clock CK2 is set at 4 V, the driving nodes n151, n155, and n153 are discharged from 2 V to 0 V, and the driving nodes n154, n152, and n156 are charged from 2 V to 4 V. The voltage at the nodes N1, N5, and N3 lowers by 2 V, and the voltage at the nodes N4, N2, and N6 rises by 2 V. However, when the voltage at the subsequent stages is lower, charges immediately flow from the power supply Vcc or the capacitors at the preceding stages to the nodes of the next stages through the diodes, so the voltage converges to a predetermined level. This boosted voltage is held by the load capacitor CL.

Charges stored on the sides of the driving nodes n151, n155, and n153 of the capacitors CP1, CP5, and CP3 are removed through the node driving circuits 11 to 13, respectively. Therefore, the loss charge amount is C×Vcc/2×3, i.e., $\frac{3}{2}$×C×Vcc (coulomb).

At time T8, when the control signal P0 goes high to close the switches TSW151 to TSW153, charges in the capacitors CP4, CP2, and CP6 move to the sides of the capacitors CP1, CP5, and CP3 through the switches TSW151 to TSW153, respectively, so the driving nodes are set at 2 V. At this time, only charge movement occurs, and no charge loss, i.e., no power consumption is generated.

The voltage at the nodes N1, N5, and N3 rises by 2 V, and the voltage at the nodes N4, N2, and N6 lowers by 2 V. When the voltage at the subsequent stages is lower, charges flow to the nodes of the next stages through the diodes, so the voltage converges to a predetermined level.

From time T9, the operation from time T5 to time T8 is repeated to sequentially store charges in the load capacitor CL, so a high voltage of 16 V can be obtained.

In this embodiment, structures each having three pump circuits connected in series are connected in parallel such that charges are recycles between the capacitors CP1 and CP4, between the capacitors CP2 and CP5, and between the capacitors CP3 and CP6. With this arrangement, charges flowing through the diodes D1 to D4 can be stored in the load capacitor CL in the first half of one period, and subsequently, charges flowing through the diodes D5 to D8 can be stored in the load capacitor CL in the second half of one period. Since the output voltage Voi is output twice in one period, a high voltage of 16 V can be obtained with a high current supply capability.

In this embodiment, three node driving circuits are used. However, the driving nodes n151, n155, and n153 may be commonly connected, and the driving nodes n154, n152, and n156 may be commonly connected such that they can be driven by one node driving circuit. The switches TSW151 to TSW153 can also be integrated. In this embodiment, the driving nodes at the same stage of the parallelly connected pump circuits are connected by one of the switches TSW151 to TSW153. However, the present invention is not limited to this, and the switch can be arranged between any driving nodes as far as clocks in opposite phases are supplied to the driving nodes. For this reason, the degree of freedom in mask layout can be improved.

In the first to ninth embodiments, the transistor switch TSW is constituted by a transistor. However, the present invention is not limited to this, and any switch, e.g., a transfer gate, can be used as far as it can be electrically opened/closed.

As has been described above, according to the present invention, the booster circuit has the first pump circuit to which the power supply voltage is supplied, and the second pump circuit connected to the first pump circuit. To boost the power supply voltage, the node driving circuit outputs a driving signal to the capacitors of the pump circuits to charge the capacitors, and the charges are transferred to the other capacitor by a switch means. Therefore, the power consumption of the circuit can be reduced even when the boost ratio is increased.

When the driving signal from the node driving circuit to the first and second capacitors represents a floating state, the control means controls the switch means to connect the driving nodes of the first and second capacitors. Since charges removed from the capacitor of the first pump circuit can be recycled as charges to be stored in the capacitor of the second pump circuit, a high-voltage generation circuit can be realized while halving the power consumption.

In a plurality of stages of pump circuits including the first pump circuit and having a plurality of second pump circuits, the driving nodes of odd-numbered pump circuits counted from the first pump circuit are connected to each other, and the driving nodes of even-numbered pump circuits are connected to each other. With this arrangement, the power consumption of the circuit can be reduced even when the boost ratio is increased.

In a plurality of pump circuits including the first pump circuit and having a plurality of second pump circuits, the driving nodes of two pump circuits are sequentially connected by a switch means, and opening/closing of the switch means is commonly controlled. With this arrangement, the length of wiring lines for connecting the capacitors and switches can be minimized. Therefore, noise can be suppressed, and the area necessary for interconnection can be reduced. In addition, the layout of the circuit can be easily designed.

In a plurality of pump circuits having a plurality of second pump circuits and including the first pump circuit, a switch means is connected to each driving node, and opening/closing of the switch means is commonly controlled. Therefore, when a high voltage is to be generated, the number of input/output lines of each portion can be decreased, and consequently, the layout of the circuit can be easily designed.

A plurality of pump circuit groups each comprising a plurality of pump circuits having a plurality of second pump circuits and including the first pump circuit are connected in parallel. The output voltage of each pump circuit group is obtained twice in one period. With this arrangement, a high voltage can be generated with a high current supply capability, and simultaneously, a circuit with a low power consumption can be realized.

What is claimed is:

1. A booster circuit comprising:

a first pump circuit having a first rectifying device, said first rectifying device having one terminal to which a voltage is supplied and the other terminal connected to a first capacitor through a first connection point;

a second pump circuit having a second rectifying device, said second rectifying device having one terminal connected to the first connection point and the other terminal connected to a second capacitor through a second connection point;

a pump circuit group having a plurality of pump circuits connected to said second pump circuit through the second connection point;

a node driving circuit for outputting a driving signal to a driving node on an opposite side of the connection point of each of said capacitors;

switch means connected between a first driving node connecting the driving nodes of odd-numbered pump circuits counted from said first pump circuit and a second driving node connecting the driving nodes of even-numbered pump circuits; and control means for driving said switch means to control a potential of each of said capacitors, wherein the voltage supplied to said first capacitor is boosted, and the boosted voltage is output through the connection points including the first and second connection points.

2. A circuit according to claim 1, wherein said node driving circuit has a function of temporarily setting the driving nodes in a floating state in switching the driving signal, and when the driving nodes from said node driving circuit to said first and second capacitors are in the floating state, said control means closes said switch means to connect the driving nodes of said first and second capacitors and controls a potential at the driving nodes to an intermediate level of the potential.

3. A circuit according to claim 1, wherein said node driving circuit is constituted by at least two CMOS circuits and can output three output states of a high-level output, a low-level output, and a high-impedance output.

4. A circuit according to claim 1, wherein said node driving circuit is constituted by at least two clocked inverter circuits and can output three output states of a high-level output, a low-level output, and a high-impedance output.

5. A circuit according to claim 1, wherein said node driving circuit is constituted by a p-type transistor having a source and drain connected between one driving node and a power supply, and an n-type transistor having a drain and source connected between the other driving node and ground, and has a period when said two transistors are simultaneously turned off.

6. A booster circuit comprising:

a first pump circuit having a first rectifying device, said first rectifying device having one terminal to which a voltage is supplied and the other terminal connected to a first capacitor through a first connection point;

a second pump circuit having a second rectifying device, said second rectifying device having one terminal connected to the first connection point and the other terminal connected to a second capacitor through a second connection point;

a pump circuit group having a plurality of pump circuits connected to said second pump circuit through the second connection point;

a node driving circuit for outputting a driving signal to a driving node on an opposite side of the connection point of each of said capacitors; and switch means sequentially connecting, in said plurality of stages of pump circuits including the first pump circuits, driving nodes of each set of two odd- and even-numbered pump circuits counted from the first pump circuit, wherein opening/closing of said switch is commonly controlled.

7. A circuit according to claim 6, wherein said node driving circuit has a function of temporarily setting the driving nodes in a floating state in switching the driving signal, and when the driving nodes from said node driving circuit to said first and second capacitors are in the floating state, said control means closes said switch means to connect the driving nodes of said first and second capacitors and controls a potential at the driving nodes to an intermediate level of the potential.

8. A circuit according to claim 6, wherein said node driving circuit is constituted by at least two CMOS circuits and can output three output states of a high-level output, a low-level output, and a high-impedance output.

9. A circuit according to claim 6, wherein said node driving circuit is constituted by at least two clocked inverter circuits and can output three output states of a high-level output, a low-level output, and a high-impedance output.

10. A circuit according to claim 6, wherein said node driving circuit is constituted by a p-type transistor having a source and drain connected between one driving node and a power supply, and an n-type transistor having a drain and source connected between the other driving node and ground, and has a period when said two transistors are simultaneously turned off.

11. A booster circuit comprising:

a first pump circuit having a first rectifying device, said first rectifying device having one terminal to which a voltage is supplied and the other terminal connected to a first capacitor through a first connection point;

a second pump circuit having a second rectifying device, said second rectifying device having one terminal connected to the first connection point and the other terminal connected to a second capacitor through a second connection point;

a pump circuit group having a plurality of pump circuits connected to said second pump circuit through the second connection point;

a node driving circuit for outputting a driving signal to a driving node on an opposite side of the connection point of each of said capacitors; and switch means sequentially connecting, in said plurality of stages of pump circuits including the first pump circuits, driving nodes of each set of two even-and odd-numbered pump circuits counted from the first pump circuit, wherein opening/closing of said switch means is commonly controlled.

12. A circuit according to claim 11, wherein said node driving circuit has a function of temporarily setting the driving nodes in a floating state in switching the driving signal, and when the driving nodes from said node driving circuit to said first and second capacitors are in the floating state, said control means closes said switch means to connect the driving nodes of said first and second capacitors and controls a potential at the driving nodes to an intermediate level of the potential.

13. A circuit according to claim 11, wherein said node driving circuit is constituted by at least two CMOS circuits and can output three output states of a high-level output, a low-level output, and a high-impedance output.

14. A circuit according to claim 11, wherein said node driving circuit is constituted by at least two clocked inverter circuits and can output three output states of a high-level output, a low-level output, and a high-impedance output.

15. A circuit according to claim 11, wherein said node driving circuit is constituted by a p-type transistor having a source and drain connected between one driving node and a power supply, and an n-type transistor having a drain and source connected between the other driving node and ground, and has a period when said two transistors aare simultaneously turned off.

16. A booster circuit comprising:

a first pump circuit having a first rectifying device, said first rectifying device having one terminal to which a voltage is supplied and the other terminal connected to a first capacitor through a first connection point;

a second pump circuit having a second rectifying device, said second rectifying device having one terminal connected to the first connection point and the other terminal connected to a second capacitor through a second connection point;

a pump circuit group having a plurality of pump circuits connected to said second pump circuit through the second connection point; and a node driving circuit for outputting a driving signal to a driving node on an opposite side of the connection point of each of said capacitors; and switch means connected to the driving nodes of said plurality of stages of pump circuits including said first pump circuit, wherein opening/closing of said switch means is commonly controlled.

17. A circuit according to claim 16, wherein said node driving circuit has a function of temporarily setting the driving nodes in a floating state in switching the driving signal, and when the driving nodes from said node driving circuit to said first and second capacitors are in the floating state, said control means closes said switch means to connect the driving nodes of said first and second capacitors and controls a potential at the driving nodes to an intermediate level of the potential.

18. A circuit according to claim 16, wherein said node driving circuit is constituted by at least two CMOS circuits and can output three output states of a high-level output, a low-level output, and a high-impedance output.

19. A circuit according to claim 16, wherein said node driving circuit is constituted by at least two clocked inverter circuits and can output three output states of a high-level output, a low-level output, and a high-impedance output.

20. A circuit according to claim 16, wherein said node driving circuit is constituted by a p-type transistor having a source and drain connected between one driving node and a power supply, and an n-type transistor having a drain and source connected between the other driving node and ground, and has a period when said two transistors are simultaneously turned off.

21. A circuit according to claim 16, wherein each of said switch means is connected between a preceding node and a subsequent node.

22. A circuit according to claim 21, wherein one terminal of each of said switch means is connected to a corresponding one of the driving nodes, and the other terminal is commonly connected.

23. A booster circuit comprising:

a first pump circuit having a first rectifying device, said first rectifying device having one terminal to which a voltage is supplied and the other terminal connected to a first capacitor through a first connection point;

a second pump circuit having a second rectifying device, said second rectifying device having one terminal connected to the first connection point and the other terminal connected to a second capacitor through a second connection point;

a first pump circuit group having a plurality of pump circuits connected to said second pump circuit through the second connection point;

a second pump circuit group having the same arrangement as that of said first pump circuit group and an output connected to an output of said first pump circuit group;

a node driving circuit for outputting a driving signal to a driving node on an opposite side of the connection point of each of said capacitors and outputting driving signals having opposite phases to driving nodes at the same stage of said first and second pump circuit groups;

at least one switch means connected between a driving node of said first pump circuit group and a driving node of said second pump circuit group; and control means for driving said switch means to control a potential of each of said capacitors, wherein loss of removed charges is reduced, and output currents from said pump circuit groups are added to increase a current supply capability.

* * * * *

UNITED STATES PATENT AND TRADEMARK OFFICE
CERTIFICATE OF CORRECTION

PATENT NO.: 6,008,690
DATED: December 28, 1999
INVENTOR(S): Toshio TAKESHIMA, Masayoshi OHKAWA, Hiroshi SUGAWARA and Naoaki SUDO It is certified that errors appears in the above-identified patent and that said Letters Patent is hereby corrected as shown below:

Column 13, line 61 after V. delete "n,".

Column 21, line 21 delete "6T" and insert therefor --6I-- line 29, delete "Vis" and insert therefor --V is--.

Signed and Sealed this

Twenty-second Day of May, 2001

*Attest:*

NICHOLAS P. GODICI

*Attesting Officer*  *Acting Director of the United States Patent and Trademark Office*